Dec. 11, 1962 C. H. NEER 3,067,556

CARTON ERECTING AND LOADING MECHANISM

Filed Feb. 2, 1960 11 Sheets-Sheet 1

INVENTOR

CLIFFORD H. NEER

BY Rommel, Allwine and Rommel

ATTORNEYS

CARTON ERECTING AND LOADING MECHANISM

Filed Feb. 2, 1960 11 Sheets-Sheet 2

INVENTOR

CLIFFORD H. NEER

BY Rommel, Allwine & Rommel

ATTORNEYS

Dec. 11, 1962 C. H. NEER 3,067,556

CARTON ERECTING AND LOADING MECHANISM

Filed Feb. 2, 1960 11 Sheets-Sheet 3

INVENTOR

CLIFFORD H. NEER

BY Rommel, Allwine & Rommel

ATTORNEYS

Dec. 11, 1962 C. H. NEER 3,067,556

CARTON ERECTING AND LOADING MECHANISM

Filed Feb. 2, 1960 11 Sheets-Sheet 4

INVENTOR

CLIFFORD H. NEER

BY Rommel, Allwine and Rommel

ATTORNEYS

Dec. 11, 1962 C. H. NEER 3,067,556

CARTON ERECTING AND LOADING MECHANISM

Filed Feb. 2, 1960 11 Sheets-Sheet 5

INVENTOR
CLIFFORD H. NEER
BY Rommel, Allwine & Rommel
ATTORNEYS

INVENTOR
CLIFFORD H. NEER
BY Rummel, Allen & Rummel
ATTORNEYS

INVENTOR

CLIFFORD H. NEER

BY Rommel, Allwine & Rommel

ATTORNEYS

Dec. 11, 1962 C. H. NEER 3,067,556
CARTON ERECTING AND LOADING MECHANISM
Filed Feb. 2, 1960 11 Sheets-Sheet 8

INVENTOR
CLIFFORD H. NEER
BY Rommel, Allwine & Rommel
ATTORNEYS

INVENTOR

CLIFFORD H. NEER

BY Rommel, Allwine & Rommel

ATTORNEYS

CARTON ERECTING AND LOADING MECHANISM

Filed Feb. 2, 1960 11 Sheets-Sheet 10

INVENTOR
CLIFFORD H. NEER

BY Rommel, Allwine & Rommel
ATTORNEYS

INVENTOR
CLIFFORD H. NEER
BY Rommel, Allwine & Rommel
ATTORNEYS

United States Patent Office 3,067,556

Patented Dec. 11, 1962

3,067,556

CARTON ERECTING AND LOADING MECHANISM

Clifford Harvey Neer, Baltimore, Md., assignor to Burt Machine Company, Inc., Baltimore, Md., a corporation of Maryland Filed Feb. 2, 1960, Ser. No. 6,193

10 Claims. (Cl. 53—186)

This invention relates to carton erecting, flap folding and receptacle loading means.

The primary object of this invention is the provision of a commercially usable machine capable of automatically erecting a carton from its flattened or "knockdown" form, closing the flaps automatically at one end thereof and moving the carton into position for loading with receptacles, such as cans. The assemblage will erect, flap fold, load and discharge the filled cartons quickly and automatically without any attention from the operator, other than filling a magazine with flat cartons.

A further object of this invention is the provision of a continuously operated mechanism adapted to automatically take flattened cartons from a hopper or magazine and quickly and efficiently erect the walls and close the flaps thereof at one end; receive a load of desired receptacles and remove the filled cartons from the machine.

A further object of this invention is the provision of a machine provided with a magazine or hopper which receives therein a large number of cartons in flattened or "knockdown" form and feeds them individually to a mechanism which erects the walls of the carton, closes the flaps of the carton at one end, and cooperates with a loading machine to fill the cartons with the desired cans or receptacles and thereafter removes the filled cartons from the machine in order that the machine can preserve continuity of operation.

A further object of this invention is the provision of a carton erecting, folding and loading assemblage having adjustable parts which enables the handling of cartons of various sizes and types for the holding of various numbers and sizes of cans or receptacles, and which is provided with a magazine from which the flattened or "knockdown" type cartons are fed individually to carton erecting and flap folding means which erects the walls of the carton in polygonal shape, with an automatic closing of the flaps in completely squared relation at one end; the carton then being transmitted upon a carriage mechanism to a loading point where the carton flaps opposite the flap-closed end are suitably positioned for automatically receiving from a loading machine the receptacles or cans which are loaded without manual aid into the carton; the carton then being automatically up-ended into proper position and transmitted to conveying means, and removed for the next carton erecting and loading cycle.

Other objects and advantages of this invention will be apparent during the course of the following detailed description.

In the accompanying drawings, forming a part of this specification, and wherein similar reference characters designate corresponding parts throughout the several views.

Figures 1, 19, 20, 21, 22, 23:
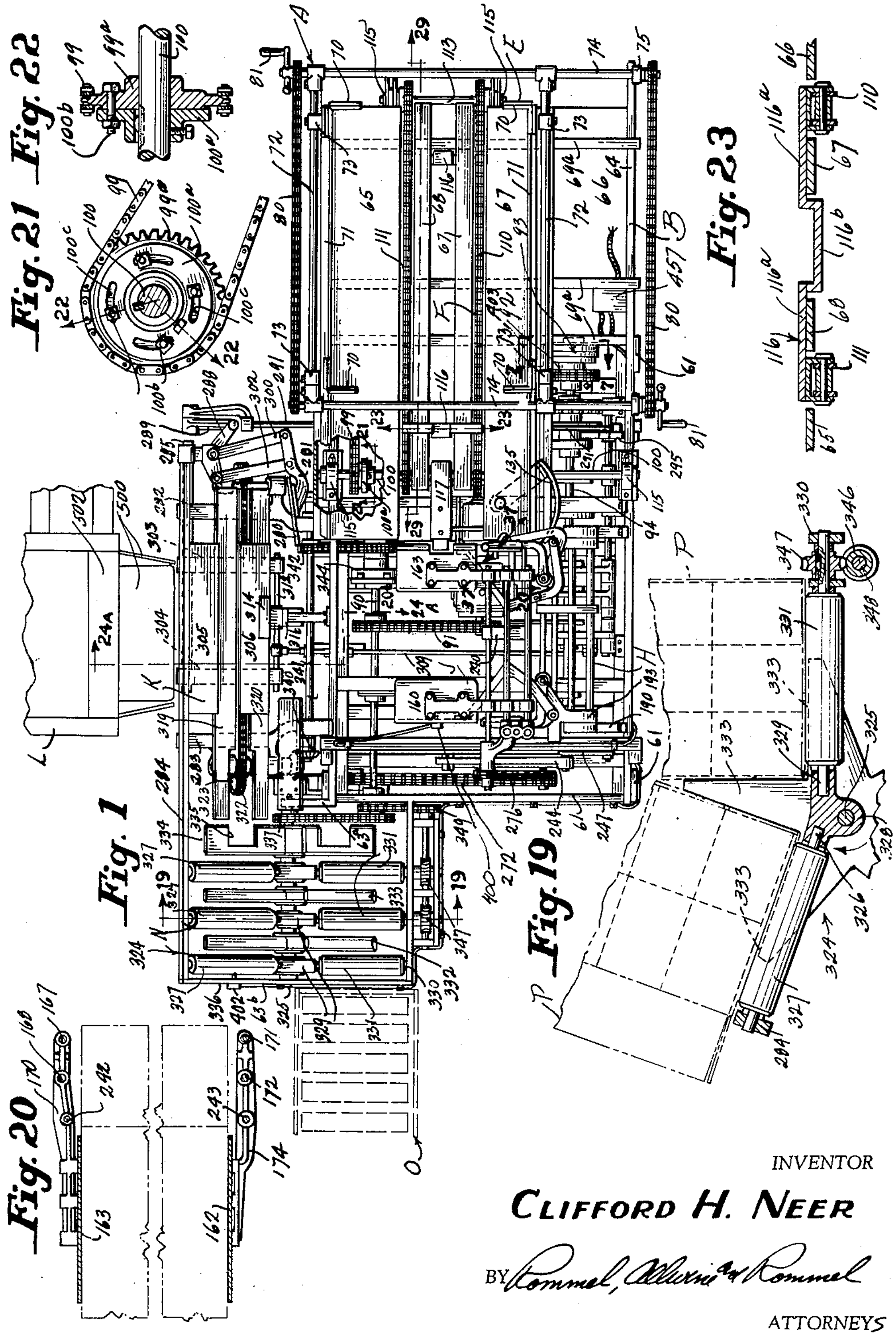
FIGURE 1 is a plan view of the improved carton-erecting, flap-closing and loading assemblage.
FIGURE 19 is a cross sectional view taken substantially on the line 19—19 of FIGURE 1, showing more particularly the carton tilting mechanism adapted to upend the carton after being loaded.
FIGURE 20 is a cross sectional view taken substantially on the line 20—20 of FIGURE 30 showing details of the carriage carton holders.
FIGURE 21 is a cross sectional view taken substantially the line 21—21 of FIGURE 1 and more particularly showing an adjustable means for the feeder mechanism sprocket whereby to accurately adjust the mechanism for carton feeding.
FIGURE 22 is a cross sectional view taken substantially on the line 22—22 of FIGURE 21.
FIGURE 23 is a transverse cross sectional view taken substantially on the line 23—23 of FIGURE 1 showing a carton pusher bar which is adapted to eject the bottommost carton from the hopper or magazine into position for erection.

FIGURE 23[a] is a sectional view of the loading table and carton holding mechanism in tilted position and which position is assumed as the carton withdraws from the can loading position and moved onto the carton discharge table.

Figures 4, 24, 25, 26:
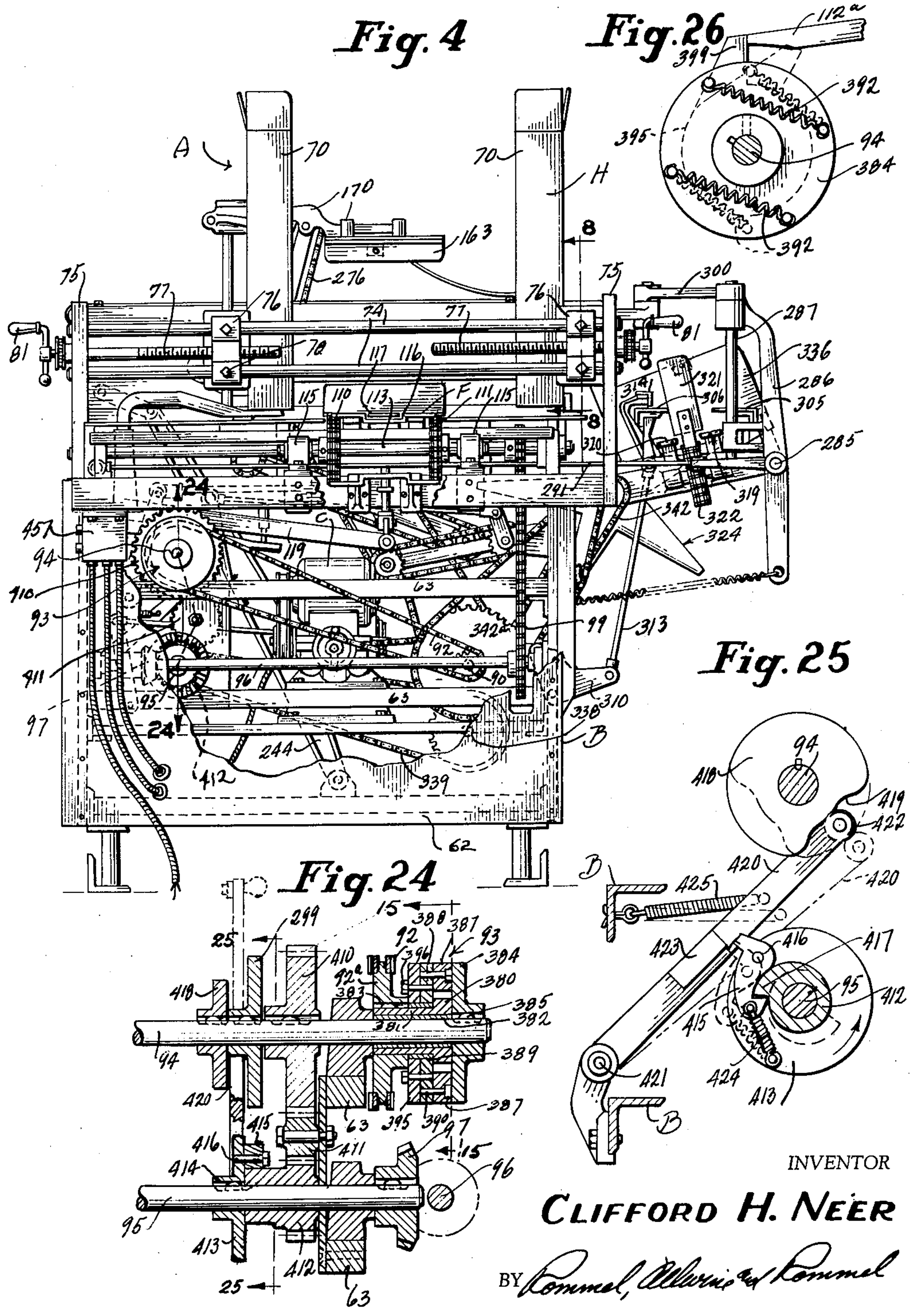
FIGURE 4 is a right end elevational view of the machine.

FIGURE 24 is a cross sectional view taken through a clutch and gear mechanism, substantially on the line 24—24 of FIGURE 4.

FIGURE 24[a] is a cross sectional view similar to FIG-

URE 23a but showing the loading table in horizontal position to support the carton in can loading position with respect to the loading machine.

FIGURE 25 is a cross sectional view taken on the line 25—25 of FIGURE 24 showing a clutch mechanism which is actuated by a cam to repeat a cycle of machine operation after a carton has been erected, loaded, upended and conveyed from the machine.

FIGURE 26 is an end view partly in cross section taken through the trip mechanism and spring means of a clutch upon the machine.

Figures 27, 28, 54:
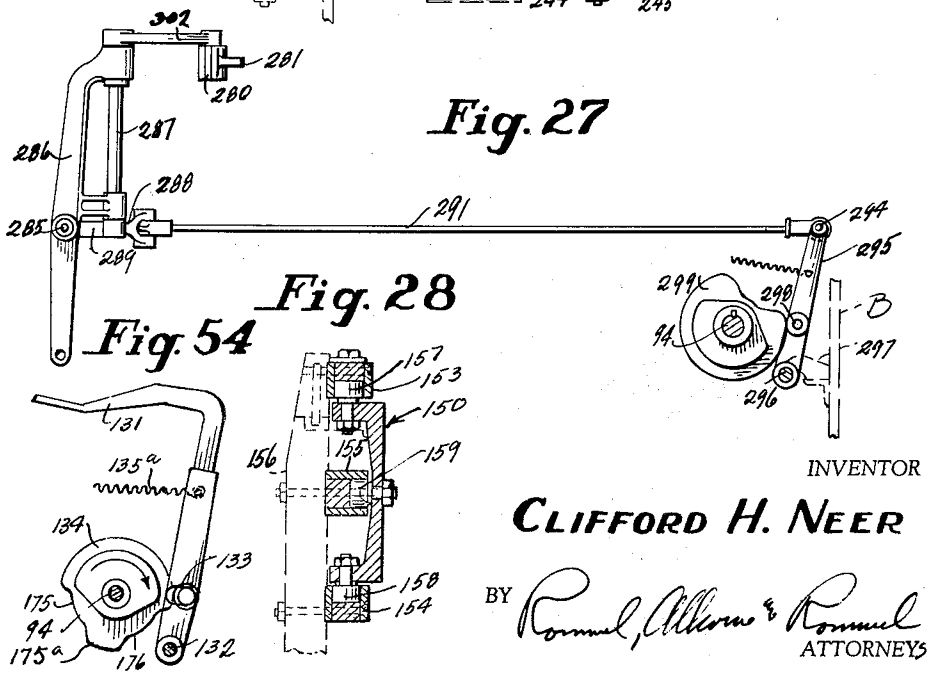

FIGURE 27 is a fragmentary view showing mechanism for moving the carton off of its carriage after erection and placing it onto a loading table.

Figure 30:
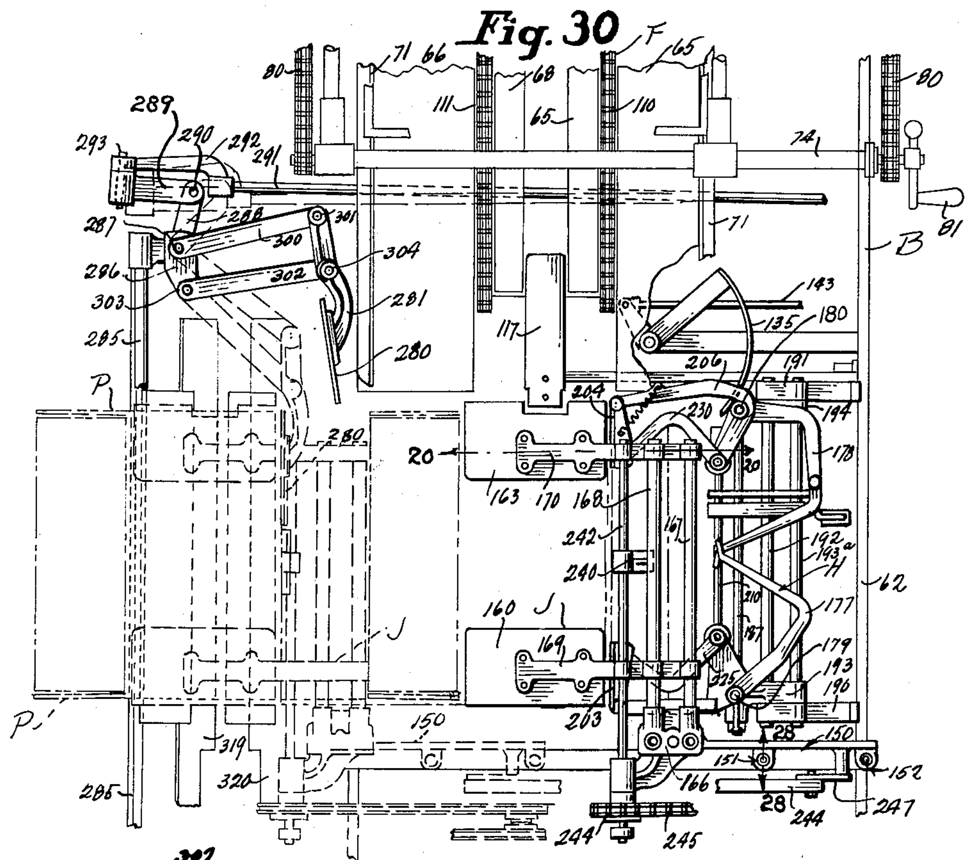

FIGURE 28 is a cross sectional view taken through certain mounting means for the carriage substantially on the line 28—28 of FIGURE 30 and showing the carriage tracks and rollers.

Figures 29, 38, 39, 40, 41, 42, 43:
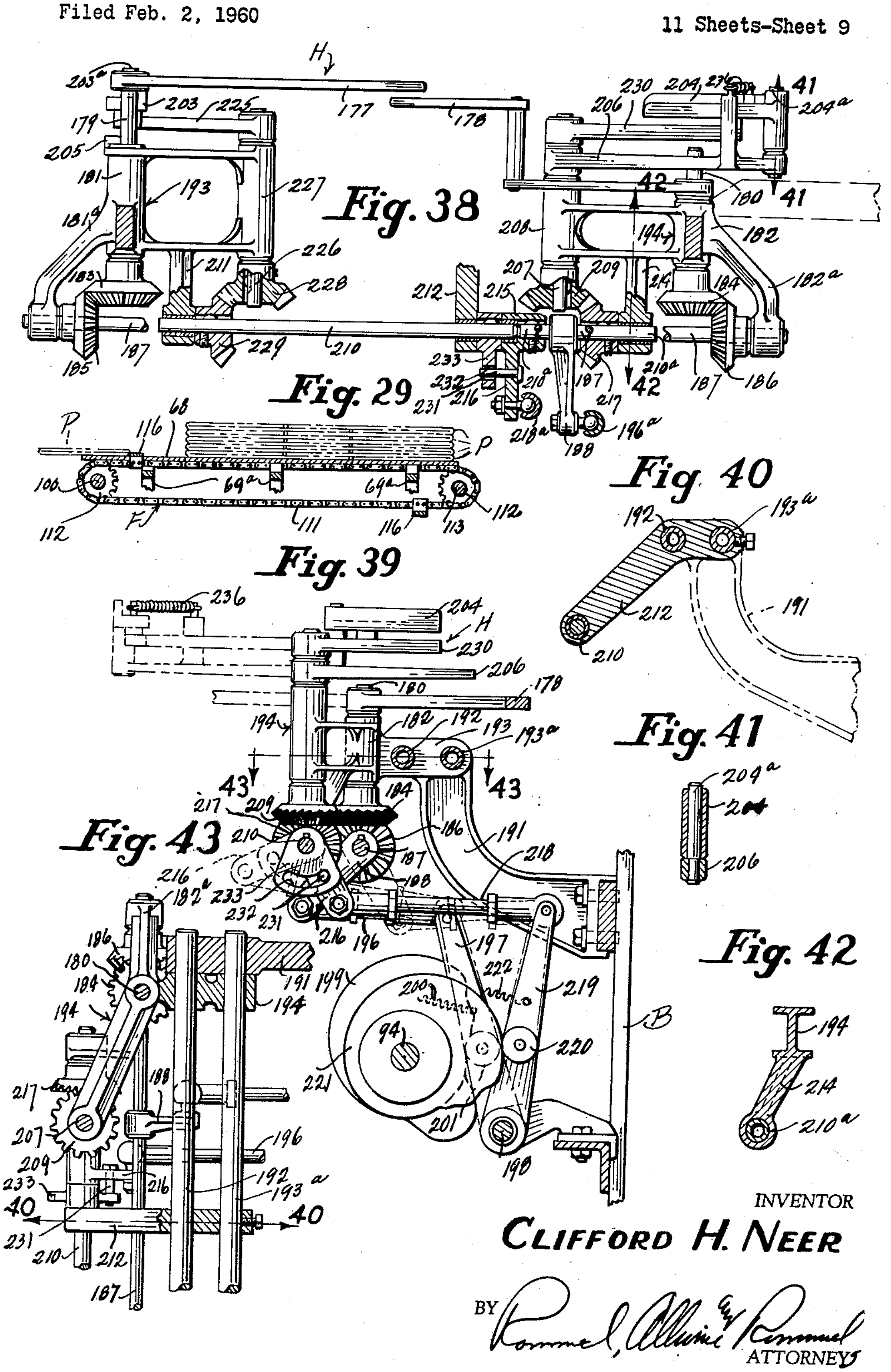

FIGURE 29 is a fragmentary cross sectional view showing the lower end of the magazine of flattened cartons and showing feeding mechanism associated therewith for individually feeding the cartons from the bottom of the stack in the direction of the erecting means; the view being taken substantially on the line 29—29 of FIGURE 1.

FIGURE 30 is a fragmentary view showing details of the carriage mechanism of the machine, and the carton erecting and flap folding mechanism; the full line positions showing the parts in the flap folding position in which the inside flaps are fully folded, and the dotted lines showing the advanced position of the carriage with the cartons in position for loading.

Figure 31:
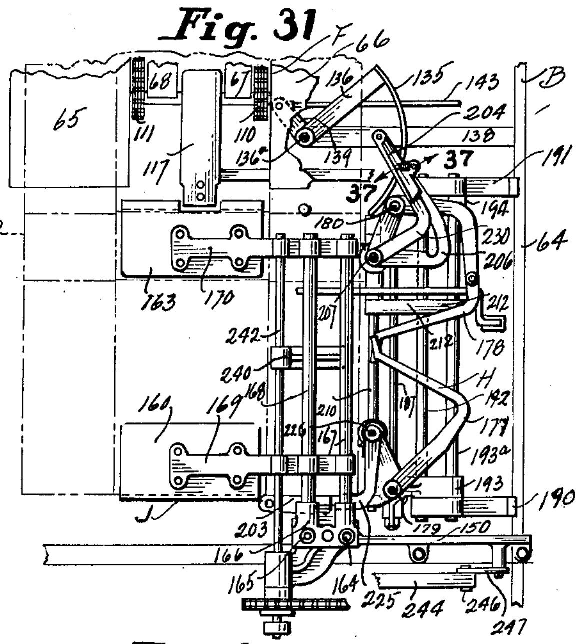

FIGURE 31 is a view of the details of the carton erecting and flap folding parts out of operation and the flat carton (dotted lines) shown in position ready for erection.

Figure 32:
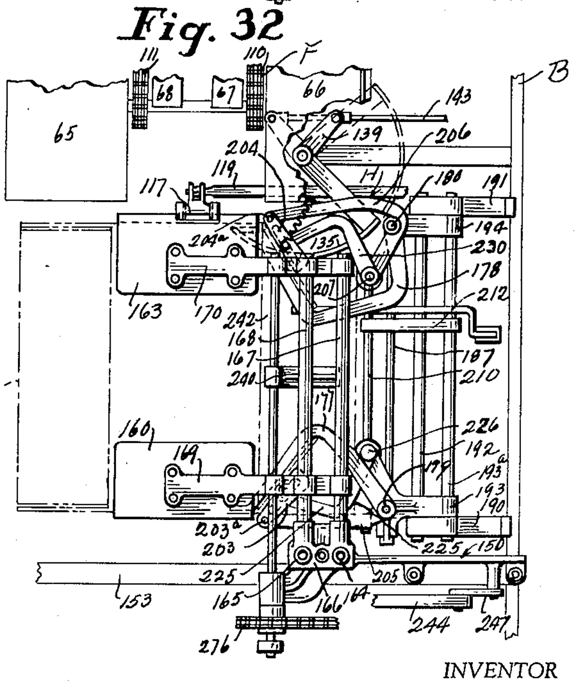

FIGURE 32 is a view similar to FIGURE 31 with the carton shown in dot and dash lines and the flap folders in operating position for flap folding purposes.

Figure 33:
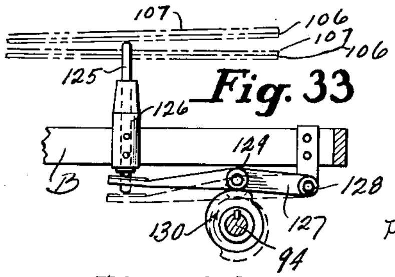

FIGURE 33 is a cross sectional view showing operation of a member for flap lifting as an initial step in the erection of the carton.

Figure 34:
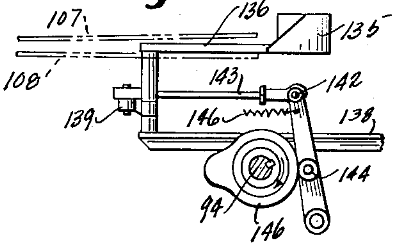

FIGURE 34 is a fragmentary view, partly in section, showing a spear for separating certain end flaps of the carton.

Figure 35:
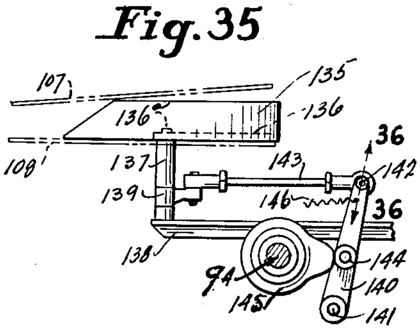

FIGURE 35 shows the details of FIGURE 34 in an advanced flap spreading position of the spear.

Figure 36:
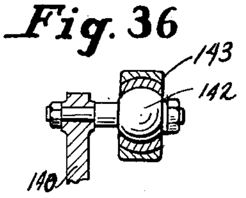

FIGURE 36 is a cross sectional view taken substantially on the line 36—36 of FIGURE 35.

Figure 37:
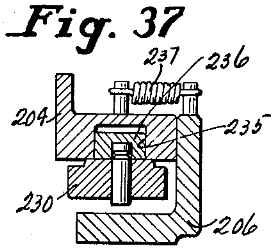

FIGURE 37 is a cross sectional view taken substantially on the line 37—37 of FIGURE 1.

FIGURE 38 is a fragmentary cross sectional view taken through certain details of the carton forming means and more particularly showing the means for actuation of anti-crush arms, for the purpose of holding side walls of the carton against collapse after erection and during subsequent flap folding operation.

FIGURE 39 is a cross sectional view, partly in section, showing certain cam actuating means for the details of FIGURE 38.

FIGURE 40 is a cross sectional view taken substantially on the line 40—40 of FIGURE 43.

FIGURES 41 and 42 are cross sectional view taken substantially on the respective lines 41—41 and 42—42 shown in FIGURE 38.

FIGURE 43 is a cross sectional view taken substantially on the line 43—43 of FIGURE 39.

FIGURES 44 to 51 inclusive are views showing the successive steps in carton erection and flap formation in respect to feeding means and a carriage, the detailed steps shown being hereinafter subsequently described.

Figures 3, 16, 17, 52:
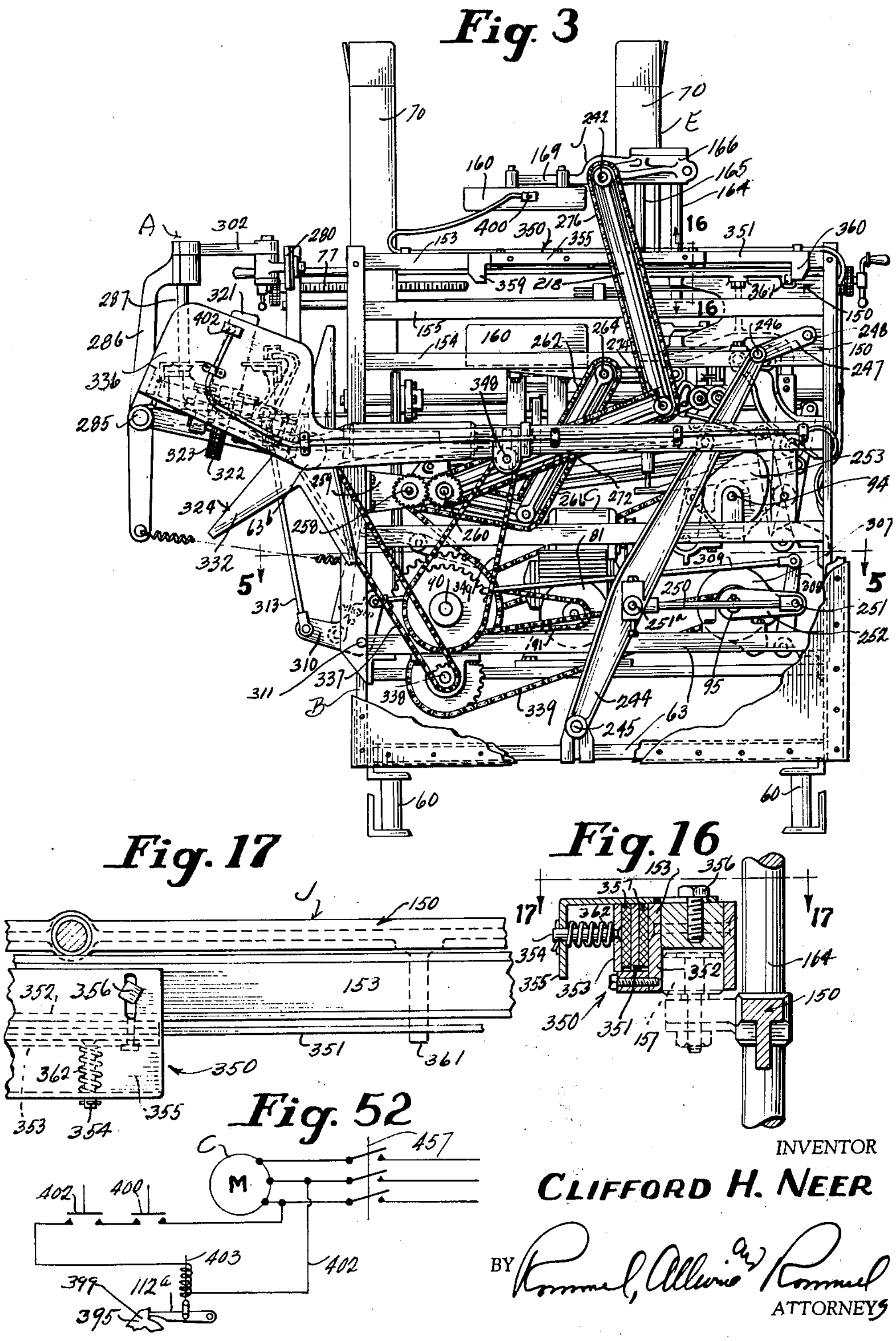
FIGURE 3 is a left end elevational view of the machine.
FIGURE 16 is a fragmentary cross sectional view taken through a friction brake provided to brake movement of the carton advancing carriage, the view being taken on the line 16—16 of FIGURE 3.
FIGURE 17 is a fragmentary view, partly in section, taken on the line 17—17 of FIGURE 16 and showing additional details of the friction brake.

FIGURE 52 is a wiring diagram showing a cam actuating motor and its wiring assemblage wtih respect to certain switch and clutch operating means.

Figure 53:
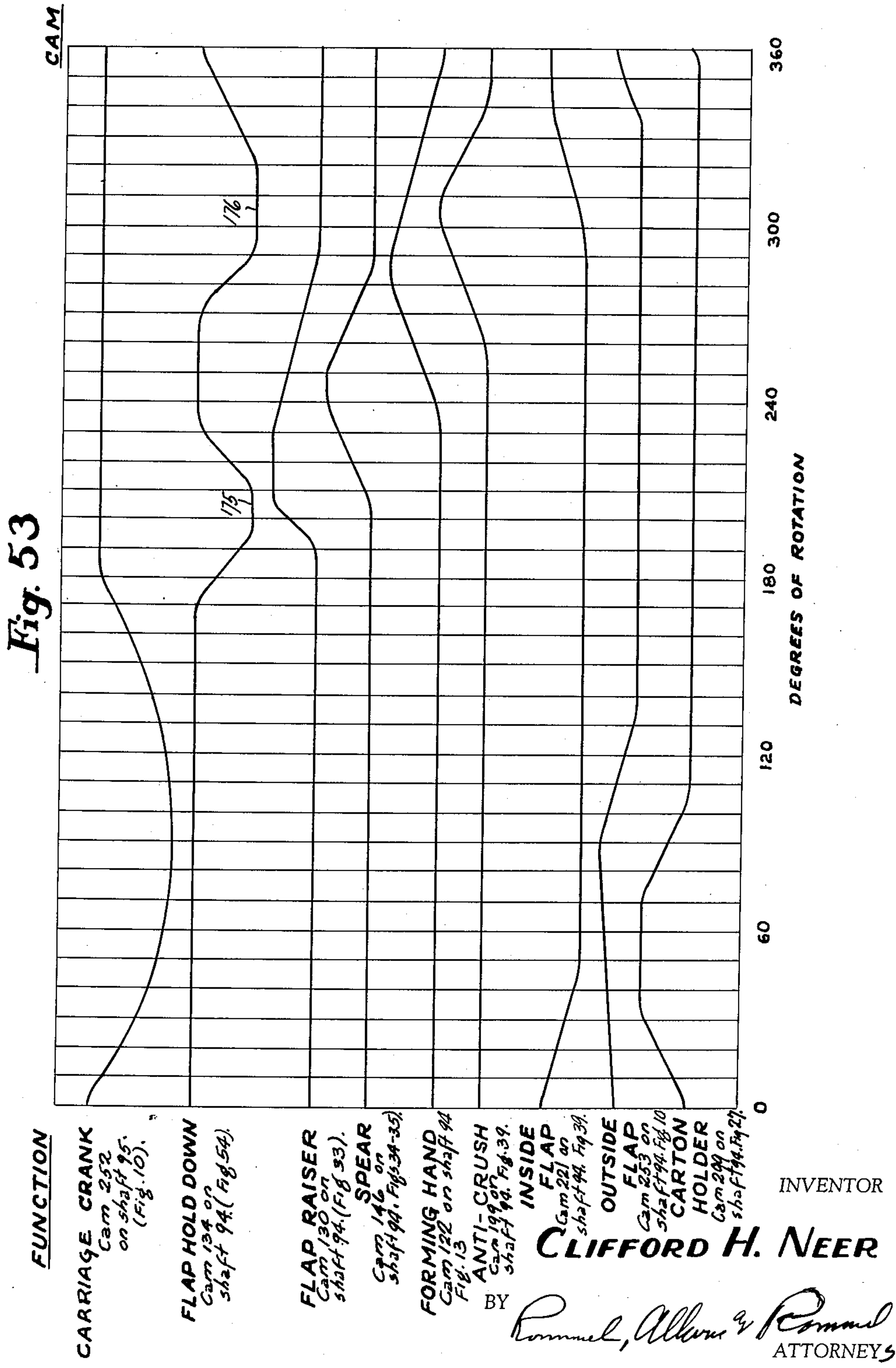

FIGURE 53 is a diagrammatic showing of the cam profiles and the sequence of carton erecting, flap folding, loading and carton discharge operations.

FIGURE 54 is a view, partly in section, of the operating means for a carton flap hold-down arm.

In the drawings, the letter A generally designates the carton erecting and loading machine. It has a frame B; prime mover (electric motor) C; a carton magazine or hopper E for holding the cartons in stacked flattened or "knockdown" condition. A carton feeder assemblage F is provided for individually feeding the cartons P from the magazine E onto a carriage J where the cartons are opened by carton forming mechanism H adapted to erect and control the flaps and walls of the carton. The carton, after erection, is fed onto a loading table K where it is filled with cans or receptacles from a loading machine L. A discharge mechanism N is provided for moving the carton after being filled on the loading table K onto a carton uprighting mechanism M from which the carton is removed and placed upon a case removal roller conveyor O.

Figures 10, 11:
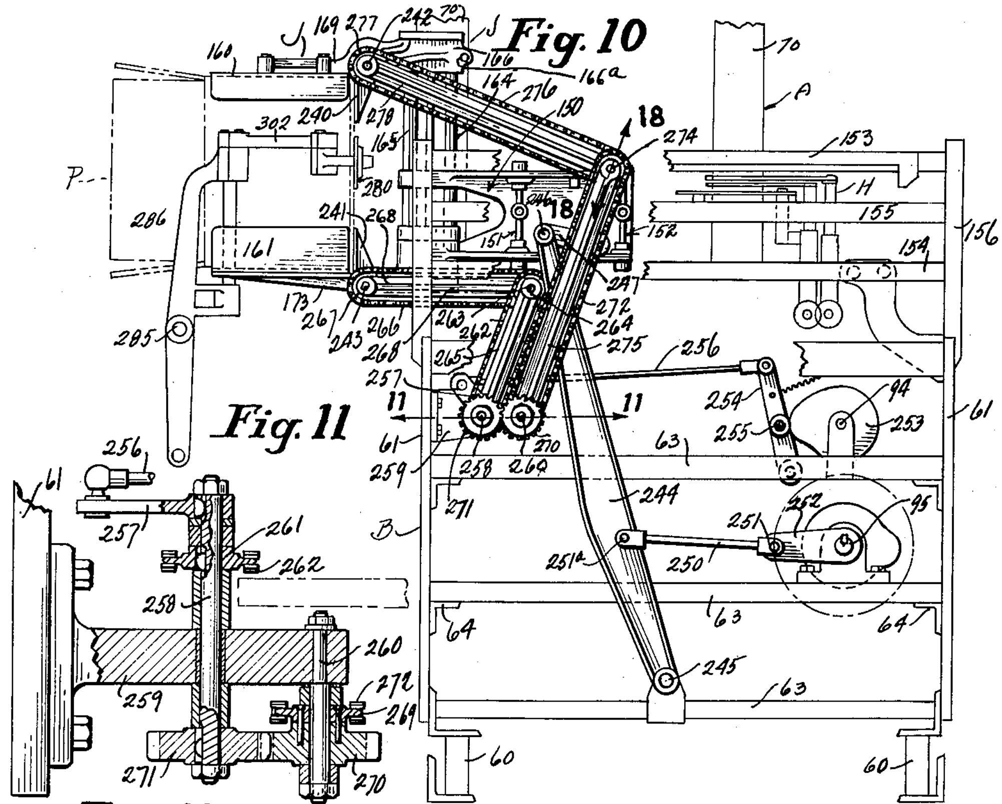
FIGURE 10 is a fragmentary view of certain details of the machine, more particularly showing the carriage operating mechanism and carton advancing and outside flap closing means.
FIGURE 11 is an enlarged detail sectional view taken substantially on the line 11—11 of FIGURE 10.

Referring to the frame structure B, the same has base feet 60 upon which vertical uprights 61 are mounted by suitable angles (see FIGURE 10). Horizontal support bars 63 (front to rear) are attached to the uprights by means of angles 64 welded or otherwise secured to the uprights. Longitudinal beams or bars 64 may also be secured to the uprights 61. Wall panels 62 may be provided, if desired.

The magazine or hopper construction E includes table plates 65, 66, 67, and 68 horizontally supported upon the frame B upon horizontal cross bars 69a which are supported by vertical standards 69 mounted upon longitudinal bars 64. The magazine or hopper corner columns 70 are angle shaped in cross section. They are mounted upon supporting means attached to the frame B for relative adjustment towards and away from each other in order that the machine may dispense cartons of different sizes. Guide angles 71 (FIG. 9) are welded to plates 65 and 66 for side guiding movement of the cartons as they are fed by feeder F from the magazine E onto the carriage J. The columns 70 are attached to horizontal rods 72 by means of brackets 73, which are secured to columns 70 (see FIGURE 8). The brackets 73 are mounted for sliding movement along the rods 72. Their positions lengthwise of the frame may be adjusted by set screws 73a (see FIGURE 9).

Figures 2, 6, 7, 8, 9, 14, 15:
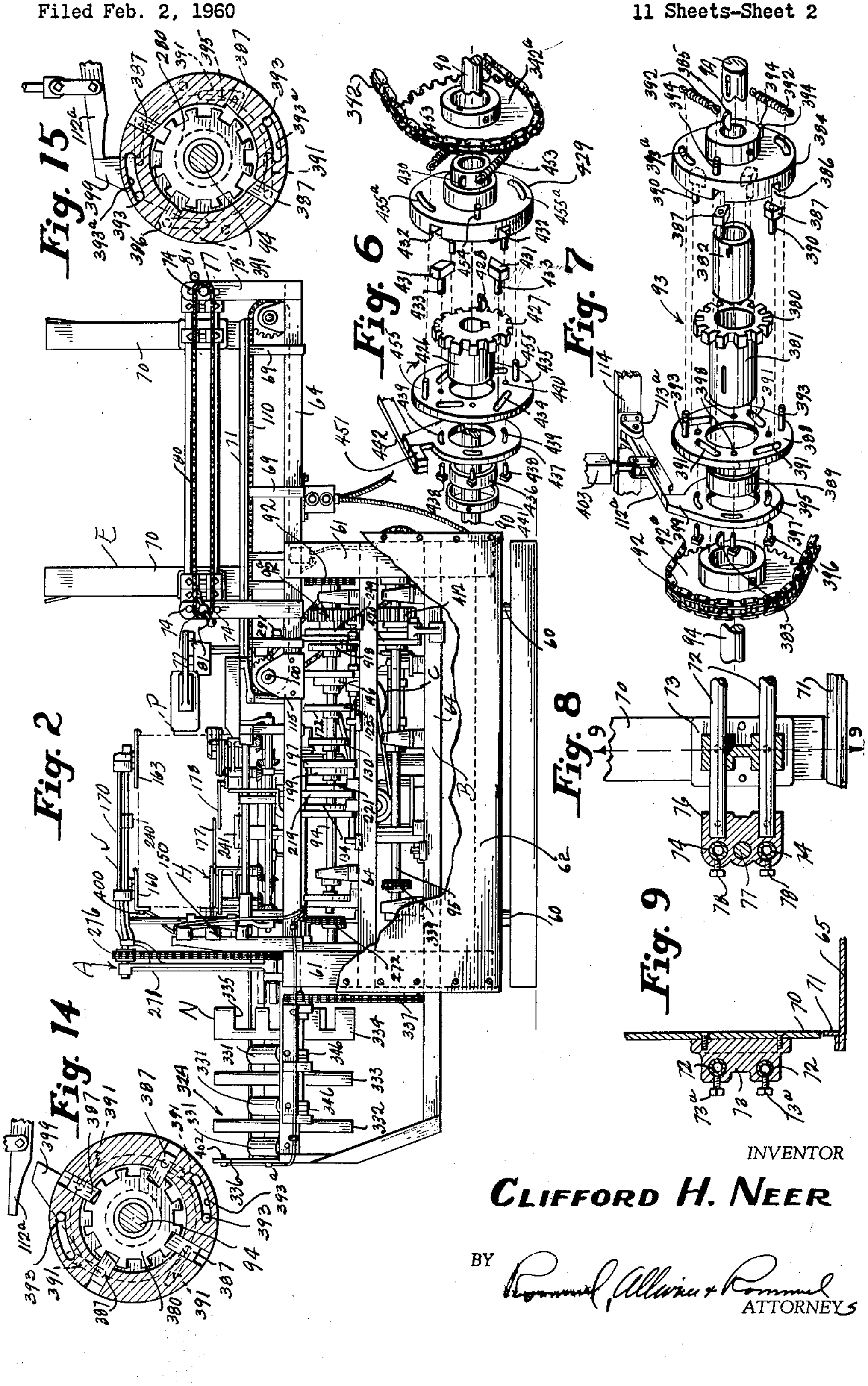
FIGURE 2 is a front elevational view of the machine showing the various operating details thereof.
FIGURE 6 is an exploded view of a clutch mechanism used in connection with carton discharge from the machine.
FIGURE 7 is an exploded view of a main clutch mechanism used for intermittent drive of certain shafting of the machine.
FIGURE 8 is a cross sectional view of certain details of the hopper or magazine size adjusting mechanism; the view being taken substantially on the line 8—8 of FIGURE 4.
FIGURE 9 is a cross sectional view taken through the hopper frame structure; the same being a view taken substantially on the line 9—9 of FIGURE 8.
FIGURE 14 is a cross sectional view taken through certain details of the clutch mechanism of FIGURES 7 and 24 and showing a detent lever released.
FIGURE 15 is a cross sectional view of the clutch mechanism of FIGURE 14 taken on the line 15—15 of FIGURE 24 showing the detent lever in restraining position and with the clutch disengaged.

The rods 72 are fixedly mounted on frame B by means of pairs of rods 74; the latter being secured in horizontal, spaced relation at each side of the hopper or magazine upon the frame uprights 75 (see FIGURES 2 and 4). The pairs of rods 72 at their ends have brackets 76 fixed thereto (see FIGURE 8) which are slidably mounted on the frame attached rods 74. The means for laterally adjusting the brackets 76 (upon rods 74) and consequently the columns 70 upon the machine consists of four screw rods 77, one adjacent to each column. Rods 77 are rotatably mounted upon the uprights 75 (see FIGURE 4). Their threaded ends are screw threaded in the respective brackets 76. The latter may be locked upon the rods 74 by set screws 78 after proper adjustment has been made. In order to facilitate simultaneous quick turning of the screw rods 77, they may be provided with sprocket and chain assemblages 80 at each side of the machine, operated by cranks 81 keyed to the rods 77 (see FIGURE 1). The bottom ends of the front column flanges are spaced slightly above the hopper table plates 65 and 66, so as to enable the lowermost flat carton in the magazine E to pass beneath the column flanges on its way for erection.

Figure 5:
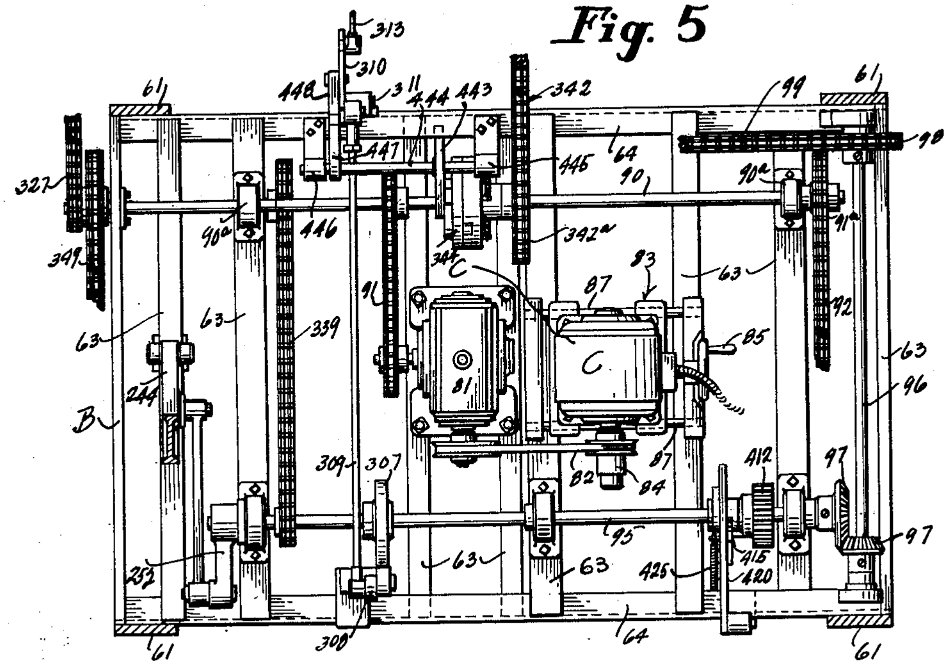
FIGURE 5 is a cross sectional view taken in a horizontal plane through the machine, substantially on the line 5—5 of FIGURE 3.
Figures 23A, 24A:
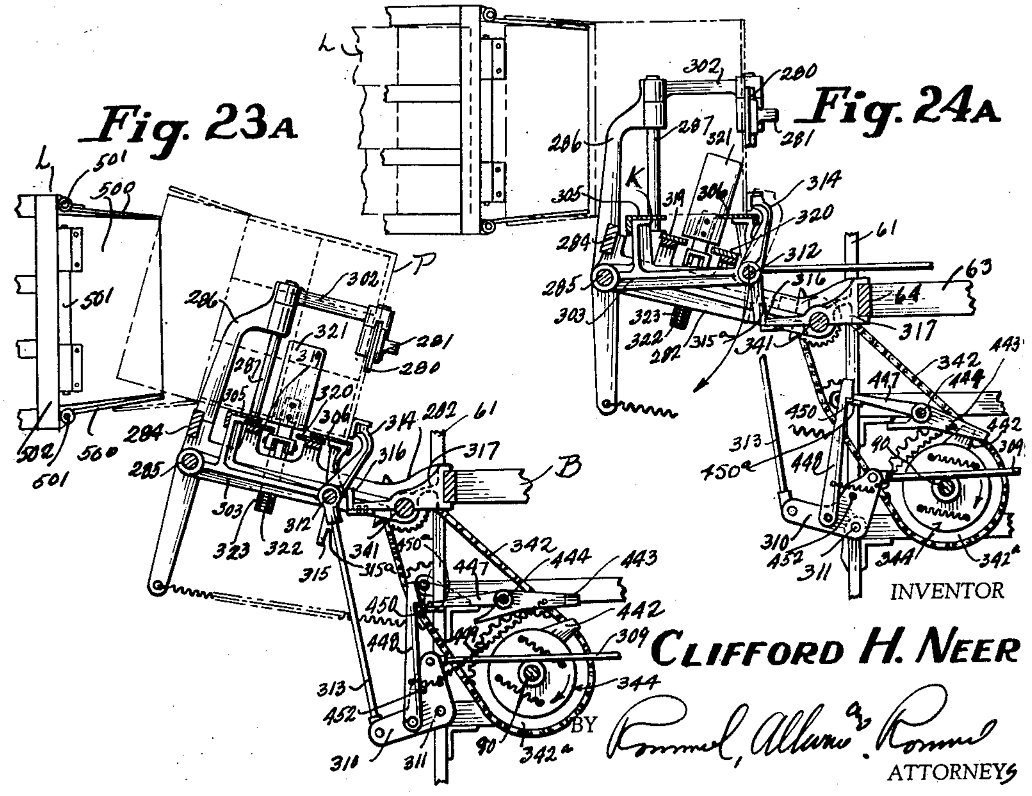

Before describing the carton feeding mechanism F, it will be well to note that the frame B supports the motor C upon cross bars 63 (see FIGURES 3, 4 and 5). Prime mover C operates the input end of a shaft of a standard speed reduction gear 81 (see FIGURE 5), by means of a V-belt 82. The gear box 81 is also mounted upon the frame cross bars or beams 63. The electric motor C runs continuously during operation of the machine and is mounted upon a standard adjustable mount in order to adjust the V-belt length and tension compatible with the setting of a standard variable speed pulley 84. The belt adjustment is made by turning the crank wheel 85. It has a screw shaft in order to slide the motor C on the supporting rods 87 to increase or decrease the distance between the shaft centers of the motor and gear box. A shaft 90 (see FIGURE 5) mounted upon the frame bars 63 is continuously driven by a chain and sprocket assembly 91 off the output shaft of the gear box 81 (FIGURE 5).

Shaft 90 mounted in bearings 90$^a$ on beams 63 (see FIGURE 5) has a sprocket 91 keyed thereto which drives a chain 92 and which in turn drives a sprocket 92$^a$ (FIGURE 24). Through a main clutch assembly 93 (FIGURES 7 and 24) intermittent rotation is transmitted to a main cam shaft 94 rotatably supported upon bearing of beams 63 of the frame B of the machine (FIGURES 2 and 24). A shaft 95 (FIGURES 2 and 24) is rotatably supported by the beams 63 (FIGURE 5) of the machine frame and is intermittently driven by the cam shaft 94 through the clutch mechanism 93. The shaft 95 is driven by spur gears 410, 411 and 412 off shaft 94. Shaft 96 has a sprocket 98 keyed thereon which operates a chain 99 (FIGURE 5). The chain 99 drives a feeder mechanism drive shaft 100 (FIGURE 1) rotatably supported upon the frame B. The shaft 100 operates the carton feeding mechanism F.

Chain 99 is trained over a sprocket 99$^a$ which is not keyed to the shaft 100 (see FIGURE 22). Instead, it is secured for adjustment to a hub 100$^a$. The hub 100$^a$ is keyed to shaft 100 (FIGURE 22) and is fastened to sprocket 99$^a$ by bolts 100$^b$ which operate in arcuate slots 100$^c$ (see FIGURE 21). By loosening bolts 100$^b$ and rotating the sprocket 99$^a$ in either direction the starting and stopping positions of the pusher bars 116 can be accurately adjusted to feed the carton into proper position for setting up purposes.

Figures 44, 45, 46, 47, 48, 49, 50, 51:
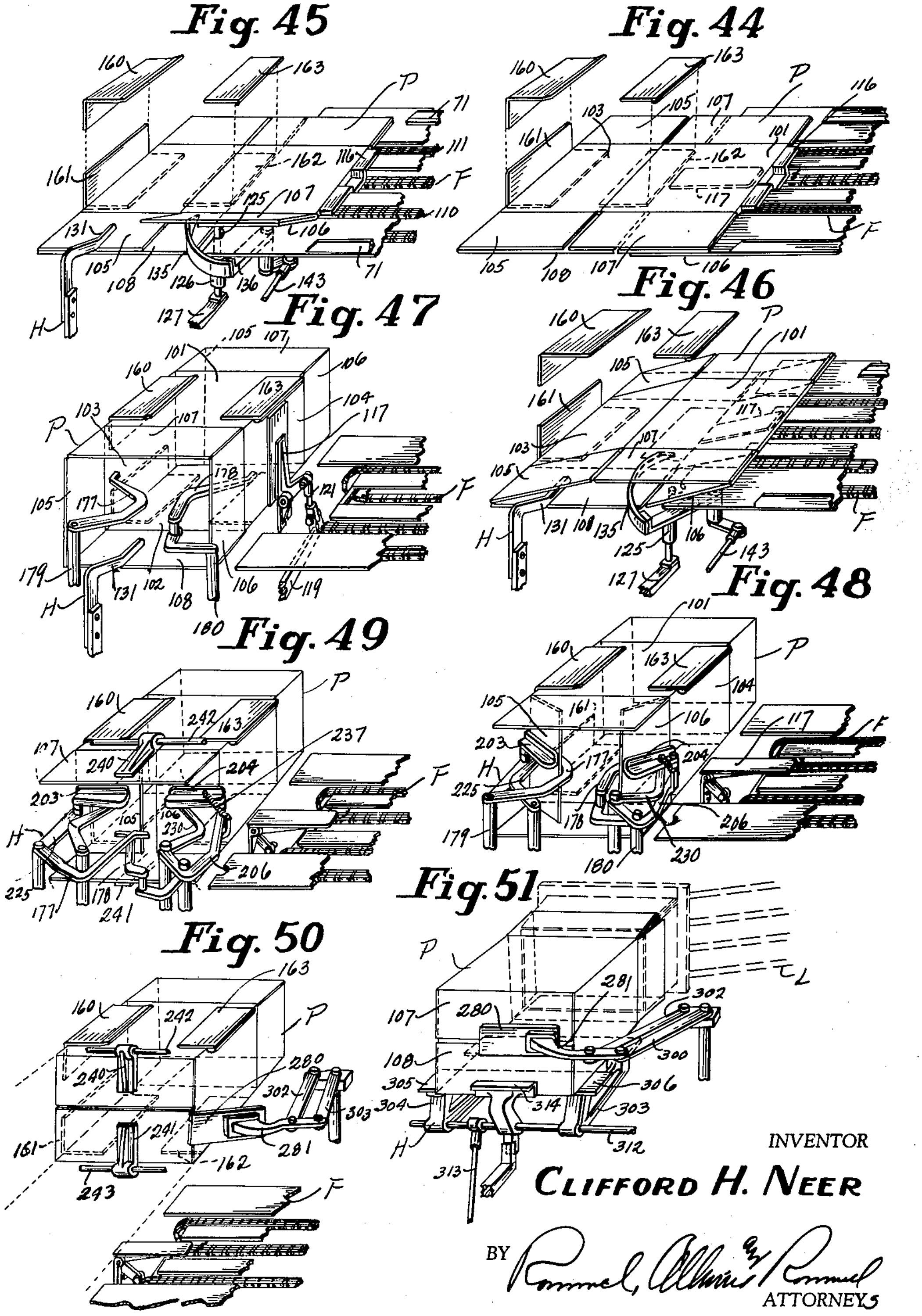

The particular type of carton P shown in the drawings, when set up, is of rectangular shape and adapted to hold two layers of twelve cans (or other containers) in each layer. To that end, this type of cartons comes in flattened or "knockdown" position as is shown in FIGURE 44. Thus the cartons are of double flap and wall thicknesses. As shown in FIGURE 47, the carton comprises a body made up of elongated or rectangular shaped walls 101 and 102 connected together along fold lines with walls 103 and 104. The walls 103 and 104 are each provided at each end margin thereof with inside flaps 105 and 106 respectively connected along fold lines. The walls 101 and 102 furthermore are each provided at each free margin thereof with outside closure flaps 107 and 108 respectively connected along fold lines. The flattened carton P, as it comes from the hopper E, is shown in FIGURE 44 and in this position, the carton is of double wall thickness with the flaps overlapping. It is within contemplation of this invention to use other shapes and sizes of cartons if so desired.

Referring to the carton feeding mechanism F, the same is adapted to move the bottom carton from the magazine or hopper E in the direction of the carton setting up mechanism H and the carriage J. The cartons are stacked with their flap closure free edges adjacent to the guide angles 71 (see FIGURES 1 and 30). The carton pushing means comprises a pair of chains 110 and 111 trained at their ends over sprockets 112 keyed upon the shafts 100 and 113. Said shafts are mounted upon suitable bearings 115 carried by the beams of the frame B (FIGURES 1, 2, and 29). These chains run in the spaces between the table plates 65, 66, 67, and 68 (FIGURE 1).

Carton pusher bars 116 are secured at their ends upon the chains 110 and 111 (see FIGURES 1, 23 and 29) and travel with the chains and transverse to the run thereof.

As shown in FIGURE 23, the bars 116 include the carton pusher plate portions 116$^a$ and a U-shaped portion 116$^b$, which in carton pushing position establishes a clearance so as not to interfere with a carton forming hand 117 to be subsequently described. The pusher bar 116 engages the right hand end of the lowermost carton P and as the chains 110 and 111 revolve, and moves it to the left where it rests at its right on the table plates 65, 66, 67 and 68 and at its left upon the movable carriage J and engages against a bottom carton holder 161 which acts as a carton stop.

As before stated, the clutch 93 transmits intermittent rotation to main cam shaft 94 off the continuously rotating sprocket 92$^a$. Shaft 94 is rotated one revolution (360°) for each cycle of operation of the machine A. Electrically operated means (to be subsequently described) is provided to actuate (raise) a clutch trip lever 112$^a$ (FIGURE 15) which is pivoted at 113$^a$ on a beam 114 of the machine frame (FIGURE 7) each time a carton is filled with the receptacles from the loading machine L.

Before describing the carton flap and wall forming mechanism H, certain details of the carriage assemblage will be described. Such details are used to initially stop the folded carton P after it has been advanced to its position shown in FIGURE 44 by the carton feeder mechanism F. The carriage assemblage J moves from front to rear in order to position the erected carton upon the loading table K in order to receive the cans or containers which are automatically delivered to the carton by a loading machine L. The latter may be of the types shown in U.S. Patents 2,462,888; 2,559,655 and 2,646,156.

The carrier assembly J includes a movable carriage frame 150 shown in FIGURES 10, 28, 30 and elsewhere. It is of channel-shaped cross section (see FIGURE 28). At the locations 151 and 152 shown in FIGURE 10 are located supporting rollers, shown in detail in FIGURE 28, which support the carriage frame 150 for movement upon an upper track 153, a lower track 154 and an intermediate track 155. Tracks 153, 154 and 155 are supported by uprights 156 mounted upon and as part of the machine frame B. The flanges of the carriage frame 150 as shown in FIGURE 28 has upper and lower rollers 157 and 158 operating in the tracks 153 and 154 respectively and frame 150 has an intermediate roller 159 operating in the intermediate track 155. The upper end lower rollers take side loads and the intermediate rollers the vertical loads.

The carriage frame 150 supports thereon lower and upper L-shaped carton holders 160 and 161 for stopping and holding the left side of a carton P. Frame 150 also supports (by means to be described) lower and upper carton holders 162 and 163 for supporting the right side of the carton P. These holders 160, 161, 162 and 163 are rigidly supported by the carriage frame 150 and moved therewith. The means for their support consists of a pair of upright standards 164 and 165 fixedly supported by the carriage frame 150 (see FIGURE 10). These standards 164 and 165, at their upper ends, support a bracket 166 which, in turn, supports a pair of non-rotatable upper horizontal rods 167 and 168 (see FIGURES 31 and 32). Rods 167 and 168 support top left and right rearwardly extending bracket arms 169 and 170 respectively. The bracket arms 169 and 170 respectively support the top carton holders 160 and 163. The carriage frame 150 likewise supports a pair of lower non-rotatable horizontal rods 171 and 172 (see FIGURE 20) which are similar to the rods 167 and 168 and lie immediately therebelow. These rods 171 and 172 adjustably support left and right bracket arms 173 (see FIGURE 10) and 174 (FIGURE 20) similar to brackets 169 and 170. The bracket arms 173 and 174 support the lower carton holders 161 and 162. Thus, it will be seen that the carton holders 160, 161, 162 and 163 are in relatively spaced rectangular relation for receiving an erected carton for holding it while it is being moved by the carriage assembly J to the leading point. Inasmuch as the machine A is intended to erect cartons of various sizes, the brackets 169 and 170, 173 and 174 are relatively adjustable along their respective supporting rods (by set screws not shown) and the bracket 166 can be adjusted by clamp screw 166[a] (see FIGURE 10) as to height upon the vertical standards 164 and 165.

Referring to the mechanism for moving the carriage J, the arm 244 is pivoted at its lower end at 245 on a beam 63 of the main frame B (see FIGURES 3 and 10). Its upper end is pivoted at 246 (FIGURE 3) to a connecting rod 247 which, in turn, is pivoted at 248 to the carriage frame 150. The lever arm 244 has a connecting rod 250 pivoted at 251[a] intermediate its ends. The rod 250 is pivoted at its other end at 251 to a crank 252 of the shaft 95. FIGURE 3 shows the starting position of the carriage J which is shown in carton loading position in FIGURE 10.

Referring to the carton forming mechanism H, a flap hold-down assembly is provided (see FIGURES 45, 46, 47 and 54). It includes an L-shaped lever arm 131 pivoted at 132 on the frame of the machine. It has a follower roller 133 (FIGURE 54) thereon between its ends which operates against the cam 134 keyed on cam shaft 94. A spring 135[a] holds the roller in engagement with the cam. It is a function of arm 131 to hold down carton flaps 105 and 108 during raising of flaps 106 and 107 (FIGURE 45).

A flap raiser assembly (FIGURES 33 and 45) consists of a vertically slidable rod or finger 125 reciprocably mounted in a guide sleeve at 126 attached to a beam of the frame B. It may be spring biased (not shown) to normally urge the finger downwardly. A lever 127 is pivoted at 128 on the frame B. It has a follower roller 129 mounted thereon between its ends which operates upon a cam 130 keyed upon the cam shaft 94. It is the function of finger 125 to raise carton flaps 106 and 107 to the position shown in FIGURE 45.

A spear assembly (FIGURES 34, 35, 45 and 46) is provided to lift up the flap and carton walls to the position shown in FIGURE 46. It includes the arcuate camming spear 135 mounted upon a swing arm 136 which has fixed thereon a vertical shaft rotatably mounted in a bearing sleeve 137. The latter is mounted on a frame angle 138. This shaft has a laterally extending crank arm 139. A lever 140 pivoted at 141 on the machine frame B is swivelled at its outer end at 142 to a connecting rod 143 pivoted to the outer end of arm 139. The lever 140 has a roller 144 thereon operating against a cam 145 keyed on the main cam shaft 94. A spring 146 urges the follower roller 144 against cam 145, (see FIGURE 35).

As the spear 135 swings into position between flaps 107 and 108 (see FIGURE 45) the hold-down finger 131 is withdrawn momentarily to allow the spear to raise the carton wall 101 (FIGURE 46). Then the hold-down finger 131 moves in again over the flap 108 (FIGURE 46). FIGURE 54 shows a cam drop 175 (FIG. 45) which first moves the finger 131 over flap 105 (FIG. 45) and a cam point 175[a] which moves the finger 131 to inoperative position, and a low point 176 which moves the finger for the second time onto flap 108 (FIG. 46) after flap 105 has been lifted by spear 135.

The forming hand 117 above mentioned (see FIGURES 12, 13, 30 and 47) is pivoted at 118 on a bracket 119[a] of the machine frame B. A lever 119 is pivoted at 120 on the frame B of the machine at one end and at its other end is connected to crank extension 117[a] of the forming hand 117 by linkage 121. A cam 122 keyed on main cam shaft 94 operates against a roller 123 mounted on the lever 119 between its ends. A tension spring 124 normally holds the roller 123 against the edge of cam 122 (see FIGURE 13).

Figures 12, 13, 18:
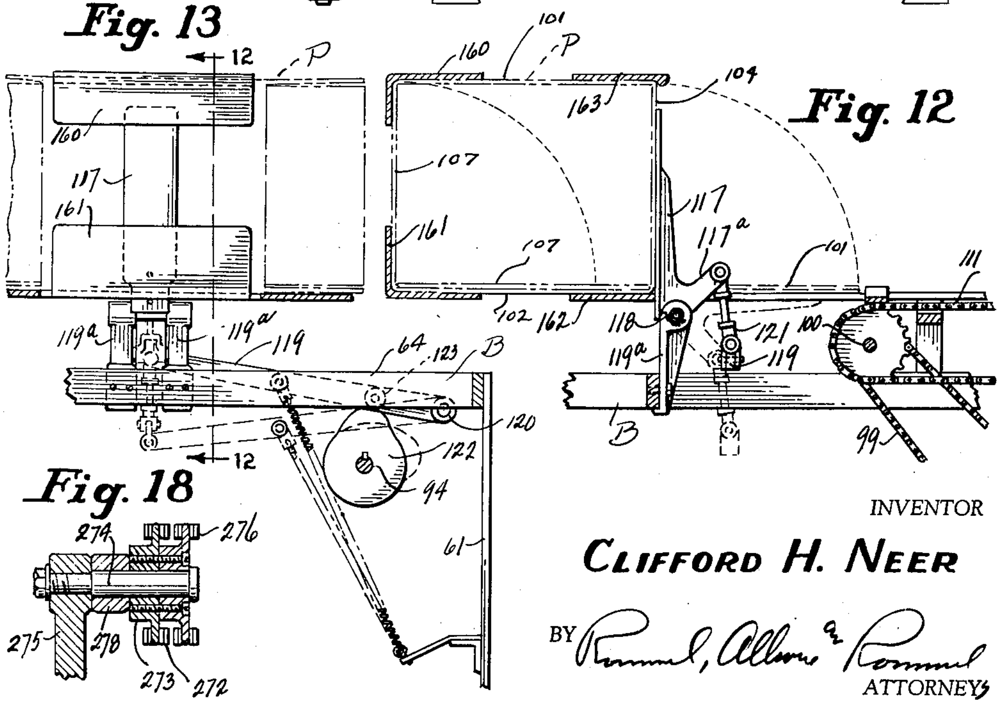
FIGURE 12 is a cross sectional view of certain details of the carton erecting means, taken substantially on the line 12—12 of FIGURE 13.
FIGURE 13 is a fragmentary end view of the carton erecting means shown in FIGURE 12, showing cam actuating mechanism therefor.
FIGURE 18 is a cross sectional view taken substantially on the line 18—18 of FIGURE 10 showing certain chain and sprocket mechanism used in connection with the assemblage for operating the carton outside flap folders.

Referring now to the erection of the carton P, as the forming hand 117 is raised from the position shown in FIGURE 1, it engages the carton wall 104 and raises the carton walls to the position shown in FIGURES 12 and 13 and 47.

While the forming hand 117 is erecting the carton P, the spear 135 and hold-down finger 131 are holding down the wall 102 and flap 108 against the carton holders 161 and 162. When the walls of carton P are erected (FIGURE 47) spear 135 is withdrawn but the finger 131 still holds down the flap 108.

The carton forming means H also includes anti-crush arms 177 and 178, the function of which is to prevent collapse of the carton walls 103 and 104 (see FIGURES 30, 31, 47, 48 and 49). The operating mechanism is rather complicated and shown in FIGURES 38 to 43 inclusive. These arms 177 and 178 are respectively keyed to the upper ends of rotatable vertical shafts 179 and 180. Brackets 190 and 191 (see FIGURES 31, 32 and 39) are attached to a beam 64 of the machine frame B. Horizontal supporting rods 192 and 193[a] are carried by the brackets 190 and 191 and they in turn support casting or brackets 193 and 194, FIGURES 31, 32 and 38, for the support of certain shafting. For instance, the shafts 179 and 180 bear in post sleeves 181 and 182 which are part of the brackets 193 and 194 respectively. Bevel gears 183 and 184 are respectively keyed to the lower ends of shafts 179 and 180. These bevel gears are respectively entrained with bevel gears 185 and 186 keyed on the remote ends of a long horizontal shaft 187. The latter is rotatably supported by bracket extensions 181[a] and 182[a] respectively forming parts of the brackets 193 and 194 (see FIGURE 38). Shaft 187 is rotated by a crank arm 188 through an angle of approximately 90° as shown in the full and dotted line positions of crank 188 in FIGURE 39.

Crank arm 188 is swivelly connected at 196[a] (see FIGURE 38) to a connecting rod 196 shown in FIGURE 39, and the connecting rod 196 is connected at its opposite end to a follower arm 197 pivotally mounted upon the shaft 198 carried by a bracket attached to the frame B as shown in FIGURE 39. The main cam shaft 94 is provided with a cam 199 thereon. A spring 200 normally urges the roller 201 into engagement with the edge of cam 199. The ends of the connecting rod 196 are attached to the crank 188 and the follower arm 197 by ball joints 196[a] as shown in FIGURE 38. This prevents misalignment and binding of parts. Rotating the crank arm 188 substantially 90° in counterclockwise direction causes the anti-crush arms 177 and 178 to withdraw to the positions shown in FIGURE 49. When the crank arm 188 is rotated 90° clockwise, the anti-crush arms 177 and 178 are swung into the positions shown in FIGURES 47 and 48 where they bear against the inside surfaces of the carton walls 103 and 104.

Referring now to the carton flap folding mechanism, inside flap folder arms 203 and 204 (see FIGURES 48 and 49) are provided for the purpose of closing the inside flaps 105 and 106.

A vertical shaft 207 rotatably bears in a supporting post 208 (see FIGURE 38) forming a part of bracket 194. A bevel gear 209 is keyed upon the shaft 207. A horizontal shaft 210 is rotatably supported upon the bracket extension 211 formed as part of the bracket structure 193 and on an arm 212 which is carried by the rods 192 and 193[a], (see FIGURES 38, 40 and 43). A shaft 210[a] is in axial alignment with the shaft 210 but is not fastened thereto and rotates independently of the shaft 210. It is supported at its right end in a bracket 214 forming part of the bracket structure 194 and at its left end it is keyed in a sleeve portion 215 of a crank arm 216; the sleeve portion 215 bears upon the extreme right end portion of shaft 210 (see FIGURE 38).

A bevel gear 217 is keyed upon shaft 210[a] (see FIGURE 38) and meshes with the bevel gear 209 of shaft 207. The crank arm 216 is pivotally connected to a connecting rod 218 (see FIGURE 39) by a ball and socket joint 218[a]; the opposite end of said rod 218 being pivotally connected to a follower arm 219 pivoted on shaft 198 attached to the frame of the machine. The follower arm 219 has a roller 220 thereon engaging the edge of a cam 221 which is keyed on the main cam shaft 94. A spring 222 normally urges the roller 220 into engagement with cam 221.

The inside flap folders 203 and 204 are pivoted in studs $203^a$ and $204^a$ mounted on arms 205 and 206. The arm 206 rotates on the rotatable vertical shaft 207. Arm 205 is welded to bracket 193. Inside flap folder 203 is operated by rotating a lever 225 which is keyed on top of a vertical shaft 226 bearing in post 227 forming part of bracket 193 (see FIGURE 38). Shaft 226 at its lower end has a bevel gear 228 meshing with the bevel gear 229 keyed to the shaft 210. Flap folder 204 is operated by a lever 230 keyed on shaft 207.

As shown in FIGURE 37 and in dotted lines in FIGURE 32, the flap folders 203 and 204 are each provided with undercut elongated slots 235 in which rollers 236 operate. The flap folding levers 225 and 230 are provided with studs supporting these rollers (see FIGURE 37). Upon swinging of the levers 225 and 230 it is obvious that the flap folders 203 and 204 swing on their pivots $203^a$ and $204^a$; this swinging action being caused by rollers 236 moving in the slots 235.

When crank arm 216 (FIGURE 39) is rotated clockwise through the first 45°, shaft 210 does not rotate and inside flap folder 203 rests. Support arm 206, folding arm 230 and the other inside flap folder 204 during this crank movement are moved by shaft $210^a$ operating off gears 209 and 217. The reason flap folder 203 rests at this stage is because pin 231 carried by crank arm 216 (FIGURES 38 and 39) works in an arcuate slot 232 in crank arm 233 keyed to shaft 210. During the remaining movement of crank arm 216, pin 231 engages the end of slot 232 and then both shafts 210 and $210^a$ rotate and through bevel gears 228, 229 and 209 and 217 swing the folding arms 225 and 230 with their flap folders 203 and 204 respectively into the positions shown in FIGURES 32 and 48.

The spring 237 shown in FIGURE 37 pulls arm 206 to its full swing position as folding arm 230 is operated.

The releasing action of flap folders 203 and 204 is caused by cam action of rollers 236 engaging sides of the cam slot 235.

When the inside flap folders 203 and 204 have reached the positions shown in FIGURES 32 and 48, the anti-crush arms 177 and 178 withdraw to the position shown in FIGURES 30 and 49 and the inside flap folders 203 and 204 proceed to the fully closed position shown in FIGURES 30 and 49. This completely closes flaps 105 and 106.

The outside flap folders 240 and 241 are keyed to shafts 242 and 243 respectively. Top shaft 242 is supported in bearings of the upper castings or brackets 166, 169 and 170 (see FIGURE 32). Lower shaft 243 is rotatably supported in lower castings or brackets 173 and 174 (FIGURES 10 and 20).

Referring to the means for driving the outside flap folder shafts 242 and 243, the chain and sprocket arrangement shown in FIGURES 3 and 10 accomplishes such operation of shafts 242 and 243 off of the main cam shaft 94. To that end, the shaft 94 is provided with a cam 253 which operates a cam follower lever 254; the latter having a roller 255 thereon engaging the edge of cam 253. The follower lever 254 is connected by a rod 256 to the end of a crank arm 257 keyed on a shaft 258. The latter is rotatably supported by a bracket 259 shown in FIGURES 3, 10 and 11 attached to a standard 61 of frame B. The bracket 259 also supports a second shaft 260.

The chain and sprocket means for operating outside flap folder shaft 243 comprises a sprocket 261 (see FIGURE 11) keyed on shaft 258 and a chain 262 trained over sprocket 261. The chain 262 at its opposite end is trained over a double sprocket 263 which is rotatable on a stub shaft 264 (FIGURE 10). The latter is supported by a frame arm 265 which is rotatably supported at its lower end upon the shaft 258. The second sprocket of the double sprocket assembly 263 has a chain 266 trained thereover and which chain at its opposite end is trained over a sprocket 267 keyed on shaft 243. The spacing of shafts 264 and 243 is maintained by a frame arm 268 mounted on said shafts.

The chain and sprocket assembly for driving shaft 242 includes a sprocket 269 mounted on shaft 260. Shaft 260 has a gear 270 rotatable thereon which meshes with a gear 271 keyed on shaft 258. The sprocket 269 is bolted to the gear 270, for rotation therewith. A chain 272 is trained at one end over sprocket 269 and at its other end it is trained over a double sprocket 273 (see FIGURE 18) rotatably supported on a stub shaft 274 carried by an arm 275 which bears upon the shaft 260. A chain 276 is trained over one of the sprocket wheels of the double sprocket 273 and at its opposite end it is trained over a sprocket 277 keyed to the outside flap folder shaft 242. A frame arm 278 supported by shafts 274 and 242 keeps the chain taut.

It will be noted that the outside flap folder shafts 242 and 243 move with carriage J. The outside flap folder chain assembly assumes the position shown in FIGURE 3 at the beginning of the cycle prior to erection of the carton P and FIGURE 10 shows the position of this assembly when the outside flap folders are in the fully closed flap folded positions. It is thus readily obvious that through the connecting rod and crank operating off cam 253 the entire sprocket and chain assembly moves to operate the outside flap holders and also moves with the carriage.

A friction brake 350 (see FIGURES 3, 16 and 17) is provided for the purpose of cushioning shocks applied to the carriage J at each terminal end of its movement. This brake consists of a movable plate 351 which slides between plates 352 and 353. The plate 352 forms part of the carriage roller track 153 and pressure plate 353 is laterally movable on pins 354 and is carried by an angle shaped frame 355 which is bolted at 356 to the carriage track 153 (see FIGURES 16 and 17). A spring 362 on each pin 354 normally urges the pressure plate 353 into braking position against plate 351. Friction linings 357 are bonded to plates 352 and 353 and apply braking pressure to both sides of the plate 351. As shown in FIGURE 3, the movable plate 351 is provided with right angled depending extensions 359 and 360 adapted to engage a brake applying lug 361 which is attached to and moves with the carriage J. As the carriage reaches a terminal position, extension 359 or 360 engages the carriage braking lug 361 and due to the above described braking action, the carriage J is brought to a gradual stop without shock.

Means is provided to hold the outside flaps 107 and 108 closed and to hold the carton P in position while loading. Such means consists of a member 280 shown in FIGURES $23^a$, $24^a$, 27, 30, 50 and 51. This member 280 has a lever arm 281 fixed therewith. FIGURE 30, in dotted lines, shows the carton and flap holding position of member 280 and the full line positions show the member 280 out of operating position.

The frame B is provided with rearwardly extending bracket arms 282 and 283 shown in FIGURES 1, $23^a$ and $24^a$ which supports a frame bar 284. These frame details form supports for the loading table K and the carton take-off conveyor N to be subsequently described. The brackets 282 and 283 support a non-rotatable axle 285 upon which part of the operating mechanism for the member 280 is mounted. The axle 285 supports a bracket 286 upon which is pivotally mounted a shaft 287 (see FIGURES $23^a$, $24^a$, 27 and 30). A crank arm 288 (FIGURE 30) is keyed to the shaft 287 and through this crank arm carton holding member 280 is operated.

To that end, the crank 288 has a link 289 pivoted at 290 thereon. A connecting rod 291 (see FIGURES 27 to 30) is pivoted at its rear end by an extension 292 upon a shaft 293 (see dotted lines FIGURE 30). A connecting rod 291 is pivoted at 294 (see FIGURE 27) to a follower arm 295, which, in turn, is pivoted at 296 to a bracket 297 bolted to frame B. The arm 295 has a roller 298 upon it which engages cam 299 keyed on cam shaft 94. As shown in FIGURE 30, the shaft 287 has keyed at one end therewith a lever arm 300 which at its remote end has a pin 301 to which the end of arm 281 is pivoted. The bracket 286 spaced from pivot 287 has a second lever arm 302 pivoted at 303. The remote end of lever 302 is pivoted at 304 to an intermediate portion of arm 281 spaced from the pin 301 and carton flap engaging member 280 (see FIGURE 30). When follower arm 295 rises out of the lower point of cam 299, the shaft 287 is rotated clockwise through connecting arm 291 and crank 288. Due to connection of spaced linkages 286 and 289, this rotates arms 300 and 302 from the full line to the dotted line postion shown in FIGURE 30 and the carton flap holder 280 moves into engagement with the carton as shown in dotted lines in FIGURES 24ª, 30 and 51.

The machine A has a loading table assemblage K which tilts between a horizontal position as shown in FIGURE 24ª to a tilted position as shown in FIGURE 23ª. This is accomplished by providing bracket arms 303 and 304 shown in dotted lines in FIGURE 1 pivoted at their rear ends on the axle 285. The loading table comprises angle plates 305 and 306 mounted on the bracket arms 303 and 304. The carton P is horizontally moved by the carriage mechanism J as above described and is brought into loading position while the loading table 305 and 306 and its supporting brackets 303 and 304 are tilted as shown in FIGURE 23ª. It is necessary that the table be so tilted during advancement of the carton on the carriage in order that the discharge trip lever 314, to be subsequently described, will be in an out-of-the-way position. As the carton P approaches the final loading position, the outside flap folders 240 and 241 withdraw with the carriage J and at this time, the carton flap member 280 moves into operating position as shown in FIGURE 51. Simultaneous with bringing of member 280 into carton flap holding position and holding the outside flaps closed, the loading tables 305 and 306 is moved upwardly to a horizontal position (see FIGURE 24ª). This is brought about by action of cam 307 (see FIGURE 3) keyed on shaft 95. Follower arm 308 operates off cam 307. A rod 309 connected to arm 308 operates the crank 310 pivoted at 311 on the machine frame B. A shaft 312 is rotatably supported by the front ends of bracket arms 303 and 304 (FIGURES 1 and 23ª). The crank arm 310 is connected to the shaft 312 by a rod 313. The discharge trip lever 314 is pivoted on shaft 312. The discharge trip lever 314 is pivoted on shaft 312. The discharge trip lever 314 is normally spring urged (not shown) into the position shown in full lines in FIGURE 24ª.

The loading table 305—306 is raised to horizontal position by cam action upon crank 310 and through the connecting arm 313. In horizontal position (FIGURE 24ª) the loading table supports the carton during the loading operation (see FIGURE 24ª). At this time, cans or containers are deposited in the open ended carton P by the loading machine L which may be of the type generally shown in U.S. Patents 2,462,888; 2,559,655 and 2,646,156.

During the loading action, the tables 305 and 306 must be supported in horizontal position. This is effected by providing a latch extension 315 on the lower end of the trip lever 314. The latch keeper 315ª rests on the angled end 316 of a frame bracket 317.

When the cans have reached their terminal positions in carton P, the force exerted by such loading movement trips the discharge trip lever 314 to the dotted line position shown in FIGURE 24ª. This throws the keeper 315ª off the restraining end 316 of bracket 317 and the loading table tilts (see FIGURE 23ª), until it comes to rest on a discharge table composed of two plates 319 and 320. These plates are supported upon frame brackets 282 and 283.

The carton P is then moved to the left along the discharge table plates 319 and 320 by pushing member 321. The latter is mounted upon a chain 322 trained over sprockets 323 mounted upon brackets 282 and 283 (see FIGURES 1, 3, 4, 23 and 24ª).

Driving means for chain 322 and sprockets 323 consists of meshed bevelled gears 340 (see FIGURE 1), one of which is keyed to shaft 341 mounted upon the frame B of the machine. Shaft 341 is driven by a chain and sprocket assemblage 342 off of shaft 90 (see FIGURES 1 and 5). The shaft 90 rotates continuously but the sprocket 342ª rotates intermittently as is shown in FIGURES 5, 6, 23ª and 24ª. It is not keyed to shaft 90. The intermittent motion of sprocket 348 is controlled by a single revolution intermittent motion clutch assemblage shown at 344 in FIGURES 5, 6, 23ª and 24ª, and which will subsequently be described. One revolution of the sprocket 342ª drives the pusher member 321 to move the carton P from loading position onto the discharge table plates 319 and 320 and the uprighting device 324.

The pusher member 321 moves the carton off the discharge table plates 319 and 320 onto a star wheel, and carton uprighting device 324. The latter consists of a rotatable shaft 325 mounted upon the horizontal supporting bar 63ª and 63ᵇ (see FIGURE 1). The uprighting device further includes a roller assemblage comprising a rear set of bracket arms 326 and supporting rollers 327; the latter of which are disposed at an acute angle to the horizontal (see FIGURE 19) for receiving the tilted carton P from the loading table K. The bracket arms 326 are connected at one end of each to hubs 328 bearing on shaft 325 and at their opposite ends to a frame rail 284. The roller assembly also includes a front set of horizontal bracket arms 329 connected to the hubs 328 at an end of each and at their opposite ends to frame piece 330 (see FIGURE 1). The arms 329 support rollers 331.

The uprighting device 324 further includes three sets of star wheels 332, 333 and 334. These sets are keyed to shaft 325. Each set has five spokes. The spokes of star wheel 334 are provided with cut-outs 335 (see FIGURE 1) to provide clearance for passage of the carton discharge pusher 321 at the left end of its movement. These spokes of set 334 are also wider than the spokes of the sets 332 and 333 in order to close the gap between spokes of set 334 and the end of the discharge table parts 319 and 320. The spokes of each set 332 and 333 and 334 have their proximate facing edges in right angled relation for seating of the carton (see FIGURE 19) against said edges. The angle of the rollers 327 and the takeoff spokes of set 333 are at the same angle as the discharge table plates 319 and 320, see FIGURE 19.

After the carton P has been pushed onto the tilted rollers 327 of the uprighting assemblage 324 to its terminal position against the stop plate 336 (see FIGURE 3), the star shaped spoke sets are rotated with shaft 325 by sprocket and chain assemblies 337 driven off of shaft 338 (see FIGURE 3). This shaft 338 is driven off shaft 95 by a chain and sprocket assembly 339. The sprocket sizes on the assembly 339 are such as to give shaft 338 a one-fifth revolution for one revolution of shaft 95. This ratio is provided in order to upright the carton to the vertical position shown in FIGURE 19 from its tilted position. In the upright position, the carton P is deposited onto the discharge rollers 331. Two of the discharge rollers 331 (right hand) are continuously driven to laterally move the carton P off of the roller and uprighting device 324 and onto the takeoff conveyor O (FIGURE 1). The drive means for these two rollers 331 includes worm and follower gears 346 and 347 (FIGURES 1 and 19). Both worm gears 346 are keyed to shaft 348 and the follower gears 347 are keyed to their respective roller shafts. Shaft 348 is driven by chain and sprocket assemblage 349 keyed on shaft 90 (see FIGURES 1, 3 and 5).

Referring to clutch 93, its chain 92 and sprocket 92[a] rotate continuously. However, through the clutch 93, shaft 94 is driven only intermittently through one revolution during each cycle of operation of the machine. That is, from the time a carton is fed onto the carriage J, erected, moved to the loading station, loaded and discharged onto the conveyor O. This is accomplished as shown in FIGURES 7, 14, 15 and 24, by providing a toothed wheel 380 having a hub portion 381 rotatably bearing on housing 382, which in turn bears on shaft 94. Sprocket 92[a] is keyed at 383 to hub 381 and thus the toothed wheel 380 rotates continuously. A pawl-supporting disc 384 is keyed at 385 to the intermittently driven shaft 94. This disc 384 is provided with radial slots 386 which slidably receive pawls 387. The latter move in the plane of wheel 380 and are adapted to engage the teeth of wheel 380 in order to drive the shaft 94. A disc 388 is provided for camming the pawls 387 into and out of engagement with the toothed wheel 380. It bears on a bushing 389 which, in turn, bears on hub 381. The pawls 387 are each provided with studs 390 which operate and are seated in diagonal cam slots 391 provided in cam disc 388. The means for rotating the cam disc 388 comprises a pair of springs 392, the outer ends of which are secured to pins 393 secured to cam disc 388. The inner ends of these springs 392 are secured to pins 394 secured on the pawl-supporting disc 384. The pins 393 extend through slots 393[a] of the disc 384 in order to permit relative rotation of discs 384 and 388.

The pawl-camming disc 388 has secured thereto a disc 395 by bolts 396. In order to provide for proper timing of the cam shaft 94, the disc 395 is provided with bolt receiving slots 397 which are coaxial with shaft 94. The bolts 396 are threaded in holes 398 of camming disc 388.

The disc 395 has a radial lug 399 peripherally provided thereon which is engaged by the lever 112[a] above described in order to hold the pawls 387 out of engagement with toothed wheel 380.

The wiring diagram shown in FIGURE 52 has a micro-switch 400 carried by the carton holder 160 (see FIGURES 1, 2 and 3) in a circuit 401 of motor C. This switch 400 is closed by carton P when erected to the extent shown in FIGURE 47. A second micro-switch 402 is provided in the circuit 271 positioned on the stop plate 336 (see FIGURES 1, 2 and 3). When a loaded carton closes switch 402, the other micro-switch 400 having been closed by a new carton being erected, the circuit 401 will be energized and operates a solenoid 403 (see FIGURES 7 and 52). The solenoid 403 lifts the trip lever 112[a] out of restraining relation with respect to lug 399. Then the tension of springs 392 causes the cam disc 388 to rotate relative to the pawl holding disc 384 and the pawls 387 engage the teeth of wheel 380. The cam shaft 94 then rotates for one revolution (360°). At the end of this revolution, both micro-switches 400 and 402 will have opened and this deenergizes solenoid 403. Trip lever 112[a] then drops into the path of lug 399 which stops cam disc 388 from rotation and the pawls 387 are cammed out of engagement with the tooth wheel 380. This stops rotation of shaft 94.

Referring to FIGURES 5 and 24, the shaft 95 drives the feeder chain 99 and chain 339. The latter in turn operates shaft 338 (see FIGURE 3) and shaft 338 rotates the chain 337 for operating the star wheel 332. The shaft 95 also operates the carriage advancing and retracting lever 244, and raises the loading table 305—306 into loading position.

Shaft 95 is driven off cam shaft 94 by spur gear 410 keyed to the shaft 94 (FIGURE 24). Spur gear 410 through an idler gear 411 drives follower gear 412 which bears on shaft 95. Disc 413 is keyed to shaft 95 at 414. This disc 413 has a clutch dog 415 pivoted thereto at 416 (FIGURES 24 and 25). The hub of gear 412 has a lug 417 laterally extending therefrom adapted to be engaged by dog 415 in order to couple the shafts 94 and 95 together. The means for operating dog 415 comprises a cam 418 keyed on cam shaft 94 which has a low point 419 therein. A dog controlling lever 420 is pivoted at 421 on a beam of the frame B. Lever 420 has a cam follower roller 422 at its free end. The arm 420 has a dog releasing extension 423. As shown in FIGURE 25, when the roller 422 engages low point 419 of the cam 418, spring 425 urges arm 420 into the position shown and the extension 423 is out of engagement with dog 415 and spring 424 then throws the dog 415 into engagement with lug 417. This couples shaft 95 with shaft 94 through gear 412. When the high point of cam 418 engages roller 422, the lever 420 is moved into the dotted line position shown in FIGURE 25 and the extension 423 releases dog 415. This stops rotation of disc 413 and consequently stops shaft 95.

Due to the ratio of gears 410, 411 and 412, one complete revolution of shaft 95 occurs in one-half (½) the time required for one revolution of shaft 94.

Referring to clutch 344 (FIGURE 6) the same controls operation of the carton pushing member 321. The manner in which this is accomplished can be seen in FIGURE 6. The shaft 90 is continuously rotating even though it extends all the way through clutch 344. The hub 426 has a tooth wheel 427 secured thereto. This hub 426 is keyed to shaft 90 by key 428. The sprocket 342[a] is keyed to pawl-supporting disc 429 by a key 430. Disc 429 bears upon, but is not keyed to shaft 90. The clutch pawls 431 is slidably mounted in slots 432 of disc 429. Each pawl 431 has a pin extension 433. These pin extensions operate in cam slots 434 of disc 435, which bears on bushing 436 which in turn bears on hub 426. A disc 437 is bolted to cam disc 435 by bolts 438 which extend through adjustment slots 439 and are threaded in holes 440 of disc 435. A retaining ring 441 is secured to the free end of hub 426 in order to hold the parts assembled. The disc 437 has a detent lug 442 peripherally extending therefrom.

Referring to FIGURES 5, 23[a] and 24[a], a clutch trip lever 443 is keyed on shaft 444; which is frame supported at 445 and 446. A lever arm 447 is also keyed on shaft 444 and at its free end engages a release arm 448 pivoted on crank 310. A spring 449 (FIGURE 23[a]) is biased to throw the clutch trip lever 443 into the path of clutch lug 442 and also to throw the arm 447 into the position shown in FIGURE 24[a]. In the latter position, arm 447 is engaged by a detent 450[a] on release arm 448 acting on extension 450 on lever arm 447. In the position shown in FIGURE 24[a], the disc 437 is held stationary by an extension 451 (see FIGURE 6) on arm 443. At this time, due to the cam slots 434, the pawls 431 are held out of engagement with the teeth of wheel 427 and sprocket 342[a] is stationary.

When the cans or receptacles are loaded in a carton P, the trip arm 314 trips off detent 316 and assumes the position shown in FIGURE 23[a]. The loading table 305—306 also tilts and this throws the crank 310 counterclockwise and trips the release arm 448; a pin 452 on the crank 310 doing the tripping (see FIGURE 23[a]). This causes the arm 447 to drop and the arm 443 to raise and release the lug 442 on disc 437. Springs 453 (see FIGURE 6) are attached at one end of each to pins 454 to pawl-supporting disc 429 and at their other ends to pins 455, the latter of which extend through slots 455[a] in the disc 429; said pins 455 being on cam disc 435. These springs 453 then cause the camming disc 435 to rotate relative to pawl disc 429 and the camming action throws the pawls 431 into engagement with teeth of wheel 427. This rotates sprocket 342[a] and through the chain 342 shaft 341 (FIGURE 1) and chain 322 moves the carton pushing member 321 along the loading table to move the can filled carton P onto the discharge rollers 327, as above described.

Sprocket 342ᵃ only makes one revolution to move the carton P onto the discharge mechanism and then at the end of its revolution spring 449 (FIGURE 23ᵃ) pulls the clutch trip arm 443 into position to stop rotation of disc 437 and likewise sprocket 342ᵃ.

The wiring circuit has a triple pole switch 457 for energizing the circuit (see FIGURES 4 and 52).

Referring to the diagrammatic showing of cam profiles (FIGURE 53), the vertical lines represent 360° of rotation of the main cam shaft 94 and also shaft 95. The profile lines show the relation of cam high and low points; said profile lines being indicated in FIGURE 53 in relation to the cams which they represent.

The loading machine L is provided with flaps 500 pivoted at 501 on the upper, lower and sides of the discharge end 502 of the machine L. These are spring biased (not shown) and assume the funnel shaped appearance shown in FIGURE 23ᵃ. The leading edges of the loading machine flaps 500 form a rectangle which is considerably smaller than the opening to carton P. Thus, the carton flaps are placed outside of the flaps 500 (see FIGURE 23ᵃ) as the carton is moved into loading position. A trip switch (not shown) is provided to actuate the ejecting means of the loading machine L when the carton P is in this position in order to deliver the right number of cans in proper alignment and layer arrangement to the carton.

BRIEF SUMMARY OF OPERATION

*First operation.*—The feeder mechanism F advances the bottom-most carton P from the hopper E into position against the carton holder 161 (see FIGURE 44).

*Second operation.*—The carton flaps 105 and 108 are held down at the end of feeder movement of the carton P by the hold down arm 131 operated off of main cam shaft 94 (see FIGURE 45).

*Third operation.*—The two carton flaps 106 and 107 are lifted by pin 125 operated off main cam shaft 94 (see FIGURE 45).

*Fourth operation.*—Spear 135 enters and lifts flap 107 and holds down flap 108 (see FIGURE 45). Also, pin 125 drops down.

*Fifth operation.*—Carton forming hand 117 engages beneath the wall 104 of the carton P and erects the carton body walls 101, 103, and 104, together with their attached end flaps (see FIGURES 46 and 47). Also flap hold down 131 reenters over flap 108 and switch 400 is closed.

*Sixth operation.*—As the carton body walls are being erected, (almost up) anti-crush arms 177 and 178 engage the inside surfaces of walls 103 and 104 (see FIGURE 47).

*Seventh operation.*—Spear 135 retracts.

*Eighth operation.*—Side flap folding arms 203 and 204 move into engagement with outer surfaces of inside flaps 105 and 106 and move them into closed position and at the same time the inside anti-crush arms 177 and 178 retract but not until flaps 105 and 106 break on their fold lines (see FIGURES 48 and 49). Also flap hold down 131 retracts.

*Ninth operation.*—Top and bottom outside flaps 107 and 108 respectively are now started to fold by flap folding arms 240 and 241 and at the same time the inside flap folding arms 203 and 204 retract and carriage J begins to move rearward. The inside flap folding arms 203 and 204 do not retract until the outside flaps 107 and 108 start to fold in order to enable the top and bottom outside flaps 107 and 108 to break properly on their fold lines, (FIGURES 49 and 50).

*Tenth operation.*—Carriage J now moves rearward and places the carton P above the loading table and into position against the loading machine funnel.

*Eleventh operation.*—Arm 280 moves against the outside surfaces of carton flaps 107 and 108 to hold all bottom flaps closed while the carton is filled (see FIGURE 51).

*Twelfth operation.*—Table 305—306 swings up under carton wall 102 to hold the carton P in stabilized position while being loaded. Otherwise, the load would be placed upon the carriage J. At the same time, the carriage J is retracted to starting position and another flat carton is erected into it, thus closing switch 400.

*Thirteenth operation.*—Pusher member 321 pushes the loaded carton P onto the conveyor rollers and over the star wheel and closes the micro-switch 402 on stop plate 336. This starts another cycle of operation.

*Fourteenth operation.*—The star wheel uprights the carton P onto the discharge rollers 331 where it is rolled off onto conveyor O.

Various changes in the size, shape and arrangement of parts may be made to the form of invention herein shown and described, without departing from the spirit of the invention or scope of the claims.

I claim:

1. In a machine for supporting erected cartons for the loading thereof, the combination of a frame, a tiltable loading table movably mounted upon said frame, cam-actuated means to normally move said loading table into a horizontal loading position, trip means mounted on the frame for holding the loading table in such horizontal position, said loading table being adapted in such horizontal position to support an erected carton lying on its side with one end closed and its opposite end opened, a loading machine having means thereon to eject a load into the carton, said trip means which under impact of the load as the carton is loaded being constructed and arranged to be tripped, the weight of the load in the carton then acting to tilt the table with the open end of the carton facing upwardly to a slight angled degree, means for laterally moving the carton away from the loading table while in tilted position, and means for subsequently fully uprighting the carton.

2. In a machine for erecting and flap closing a squared carton having a body with a plurality of walls connected on fold lines and a plurality of flaps on each end of each body wall, the combination of a frame, a magazine mounted on the frame for supporting a stack of folded cartons, means on the frame for ejecting the cartons one by one from the magazine and moving the same along the frame, means on the frame for erecting the body walls of the cartons and closing the flaps at one end of the carton while the other end flaps of the carton are opened, a reciprocable carriage movably mounted on the frame for bodily moving the thus erected carton between a starting point and a loading point, and sliding friction brake means carried by the frame and carriage whereby the shock of stopping of the carriage on the frame at each end of its movement between said points will be gradually absorbed.

3. In a machine for erecting and flap closing a carton, the combination of a frame, a magazine for supporting a stack of folded cartons upon the frame, means on the frame for ejecting the cartons one by one from the magazine and moving them along the frame, carriage means movably mounted on the frame, means for erecting the carton and closing the body wall flaps at one end of the carton while it is on the carriage, means for moving the carriage and its thus erected carton along the frame to a loading station, a tilting loading table onto which the carton in a slightly tilted position off horizontal is deposited, means for then erecting the loading table and carton to horizontal positions, a trip lever for holding the loading table and carton supported thereby in horizontal positions, a loading machine for forcefully filling the carton so that the shock of loading will trip said lever and return said table and its loaded carton to a tilted position, with the opened mouth of the carton facing slightly upwardly in an angled position, a discharge table, means on the machine for moving the loaded carton along the discharge table, roller means at the end of the discharge table onto which the last mentioned means pushes the carton while in tilted position as aforesaid, a second roller means complementary to the first mentioned roller means, means for uprighting the carton to a vertical position and dumping it onto the second roller means, and means for driving the second roller means for removal of the uprighted carton therefrom.

4. In a carton erecting and carton removal machine, the combination of a supporting frame, a magazine mounted on the frame adapted to receive a stack of folded cartons, means for one by one removal of the cartons from the magazine and moving them along the frame, a carriage movably mounted on the frame for receiving the carton from the last mentioned means, carton erecting means mounted on the frame for erecting the carton with one end opened while mounted upon said carriage, means for moving the carriage and the carton erected thereon along the frame to a loading station, a loader for loading cartons into the opened end of the carton, a loading table positioned laterally of the loading station, conveyor means for moving the loaded carton in non-uprighted position along said loading table and away from the loading location, a roller type support mounted on the frame, uprighting means for uprighting the carton onto said roller support, means for driving said roller support for discharge of the uprighted carton therefrom, and a removal conveyor receiving the uprighted carton from said roller support.

5. In a machine for erecting and flap closing a squared carton having a body with a plurality of walls connected on folding lines and a plurality of flaps on each end of the body walls, the combination of a frame, a magazine mounted on the frame for supporting a stack of such folded cartons, means on the frame for ejecting the cartons one by one from the magazine and moving the same along the frame, a reciprocable carriage movably mounted on the frame for bodily receiving the cartons from the carton ejecting and moving means above mentioned, means for erecting the body walls of the cartons after movement onto said carriage and closing the flaps at one end of the carton while the other end flaps of the carton remain open, means for reciprocating the carriage between the carton erecting location and a loading station, and braking means mounted on the frame and carriage to slow the movement of the carriage and to absorb the shock of stopping of the carriage of the frame at the ends of reciprocable movement.

6. In a machine for erecting and flap closing squared cartons each of which have a body with a plurality of walls connected on fold lines and a plurality of flaps on each end of the body walls, the combination of a frame, a magazine mounted on the frame for supporting a stack of superposed folded cartons, means on the frame for ejecting and moving the cartons one by one from the magazine, a carriage movable on the frame adapated to receive the cartons from the last mentioned means, means on the frame and carriage for erecting and supporting the body walls of the carton and closing the end flaps at one end of the carton with the other end flaps of the carton remaining open, a tiltable loading table mounted on the frame, means mounted on the frame for receiving the cartons from the carriage and moving them therefrom with one flap end of the carton still closed onto the loading table while in tilted position, means on the frame for uprighting the table into horizontal position for positioning the open flap end of the carton to receive articles therein, means on the frame for holding and latching the table in horizontal position during loading, said last mentioned means being constructed and arranged to be released by the shock of loading of articles therein whereby when the carton is loaded with articles it will tilt the table to a position off horizontal with the open end of the carton facing upwardly at an angle, means on the frame for moving the carton along the thus tilted table and while in tilted position away from the loading locus, supporting means on the frame for receiving the carton from the table while in tilted position, rotatable uprighting means on the frame for uprighting the carton from its tilted position, and means on the frame for receiving the uprighted carton.

7. The machine of claim 6 in which the supporting means which receives the tilted carton from the tilted loading table comprises a plurality of spaced rollers, and in which the uprighting means comprises a rotatable spoke-like member for engaging the underside of the carton between the rollers and uprighting the same, and in which the means for receiving the uprighted carton comprises a driven roller means.

8. In a machine for erecting squared cartons and assisting in the loading thereof, wherein said cartons comprise body walls connected on fold lines and end flaps connected by fold lines to each end of each body wall, the cartons being in knockdown or flattened condition, the combination of a supporting frame, a magazine on the frame for supporting a stack of the flattened cartons, means for automatically removing the lowermost carton from the magazine stack and moving it away from the magazine, a movable carriage on the frame onto which the carton is moved by the last mentioned means, means on the frame for erecting the body walls of the carton into squared condition, with the carton lying on its side and the flaps facing horizontally endwise, means on the frame for automatically closing all of the flaps at one end of the carton, carriage means mounted on the frame for automatically moving the carton with all of the flaps closed at said end to a loading station, a loading table, means carried by said frame other than the above mentioned flap closure means for engaging the aforesaid closed flaps of the carton and while holding all of them closed moving the carton off the carriage and onto the loading table with the end of the carton opposite the closed flaps facing sidewise and in opened condition, means pivotally mounting the loading table on the frame so that the loading table may be tilted, trip latching means normally maintaining the loading table in horizontal position to receive the carton from the carriage as aforesaid in horizontal position, a loading machine having means thereon for ejecting a load into the open ended carton while the latter is horizontal, trip means on the frame operable under the impact of loading the carton for enabling the table to tilt due to its load with the opened end of the carton facing upwardly, means to automatically move the carton along the loading table while in its tilted condition away from said loading station, and means for subsequently fully uprighting the carton.

9. In a machine for erecting and flap closing knockdown cartons in which the knockdown cartons are normally in flattened condition and provided with body walls connected together on fold lines with each body wall provided at each end with a closure flap, the combination of a supporting frame, a prime mover, a magazine on the frame for holding a stack of flattened knockdown cartons, conveyor means mounted on the frame connected with the prime mover having means thereon for automatically removing the lowermost of the knockdown cartons from said stack and advancing it along the frame, a carriage movably mounted upon said frame connected to the prime mover for operation, said carriage having carton holders thereon to engage all of the lower, side and uppermost walls of the carton when mounted in sidewise position upon said frame in squared position, means on the frame connected with the prime mover for automatically erecting the body walls upon said carton holders, means on the frame for automatically closing all of the flaps at one end of the container with the opposite end of the container facing sidewise in flap opened condition, a loading table, means on the frame and connected to the prime mover for removing the carton with all of its said end flaps closed off of the carriage and onto the loading table, means for depositing a load into the open end of the carton while on said loading table, means on the frame to automatically tilt the carton and loading table after the carton has been loaded to a partially uprighted position, means connected to the prime mover for automatically moving the carton in its tilted position along the loading table and away from the loading means, and means on the frame connected to the prime mover for subsequently fully uprighting the carton.

10. In a machine for erecting and flap closing a squared carton of the type having a body with a plurality of walls connected on fold lines and a plurality of flaps on each end of the body walls, the combination of a frame, a magazine mounted on the frame for supporting a stack of such folded cartons, a carriage movably mounted on the frame, means on the frame and carriage for erecting and supporting the carton with the end flaps at one end of the carton closed and the flaps at the other end remaining open, a loading table, means for moving the carton with its flaps closed at one end off the carriage and onto said table, means for loading the carton, said table being elongated and positioned in a line transverse to the line of movement of the carriage, means on the frame for moving the carton after loading along the table and away from the loading point to a position laterally thereof, means for uprighting the carton after the last mentioned movement, and means for moving the carton along the table comprising an endless belt having a pusher member which engages the carton to cause such lateral movement.

References Cited in the file of this patent

UNITED STATES PATENTS

| | | |
|---|---|---|
| 2,148,820 | Kimball et al. | Feb. 28, 1939 |
| 2,249,201 | Ferguson | July 15, 1941 |
| 2,289,820 | Ardell | July 14, 1942 |
| 2,612,823 | Woelfr | Oct. 7, 1952 |
| 2,651,896 | Woodruff et al. | Sept. 15, 1953 |
| 2,736,998 | Walrave et al. | Mar. 6, 1956 |
| 2,851,837 | Ardell et al. | Sept. 16, 1958 |